US006539165B1

(12) United States Patent
Rijckaert et al.

(10) Patent No.: US 6,539,165 B1
(45) Date of Patent: Mar. 25, 2003

(54) REPRODUCTION OF A DIGITAL INFORMATION SIGNAL IN A TRICK PLAY REPRODUCTION MODE

(75) Inventors: Albert M. A. Rijckaert, Eindhoven (NL); Marinus A. H. Looykens, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/244,211

(22) Filed: Feb. 4, 1999

(30) Foreign Application Priority Data

Feb. 11, 1998 (EP) .............................. 98200422

(51) Int. Cl.[7] .................................. H04N 5/91
(52) U.S. Cl. ........................... 386/78; 386/80
(58) Field of Search ..................... 386/6–8, 33, 40, 386/74, 68, 76–81, 111–112, 126

(56) References Cited

U.S. PATENT DOCUMENTS 5,142,421 A    8/1992  Kahlman et al. ............. 360/40
5,396,374 A *  3/1995  Kubota et al. ................ 360/13
5,648,855 A *  7/1997  Yanagihara ................ 360/72.2
5,684,915 A * 11/1997  Ueda et al. ................. 386/111
5,751,889 A    5/1998  Van Gestel et al. ........... 386/68
5,751,890 A *  5/1998  Yamasaki et al. ......... 360/77.15
5,889,918 A *  3/1999  Sakazaki et al. ............. 386/112
6,118,922 A    9/2000  Van Gestel et al. ........... 386/68
6,222,981 B1 *  4/2001  Rijckaert ..................... 386/68
6,317,556 B1 * 11/2001  Rijckaert ..................... 386/68
6,339,673 B1 *  1/2002  Rijckaert ..................... 386/124
6,353,701 B1 *  3/2002  Rijckaert ..................... 386/68
6,400,888 B1 *  6/2002  Eerenberg et al. ........... 386/124

FOREIGN PATENT DOCUMENTS

WO       WO9834226       8/1998       ........... G11B/20/12

* cited by examiner

Primary Examiner—Andrew Christensen
Assistant Examiner—Polin Chieu
(74) Attorney, Agent, or Firm—Edward W. Goodman

(57) ABSTRACT

A tracking control system is proposed for realizing a tracking control in a trick play reproduction mode in a helical scan reproduction apparatus. The tracking is based on the derivation of a tracking error control signal from the track numbers and the sync block numbers of the sync blocks read from the tracks in the trick play reproduction mode.

21 Claims, 23 Drawing Sheets

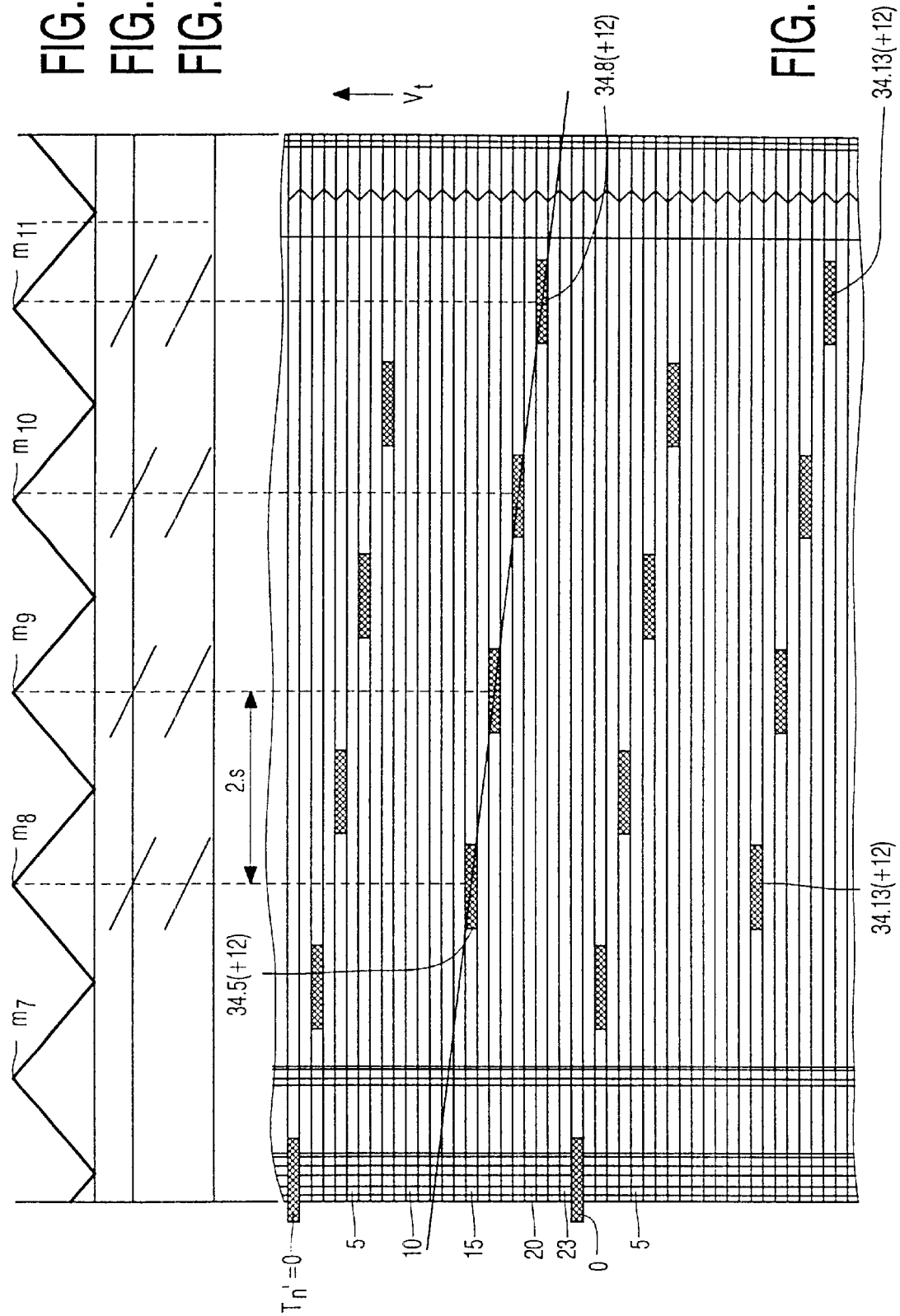

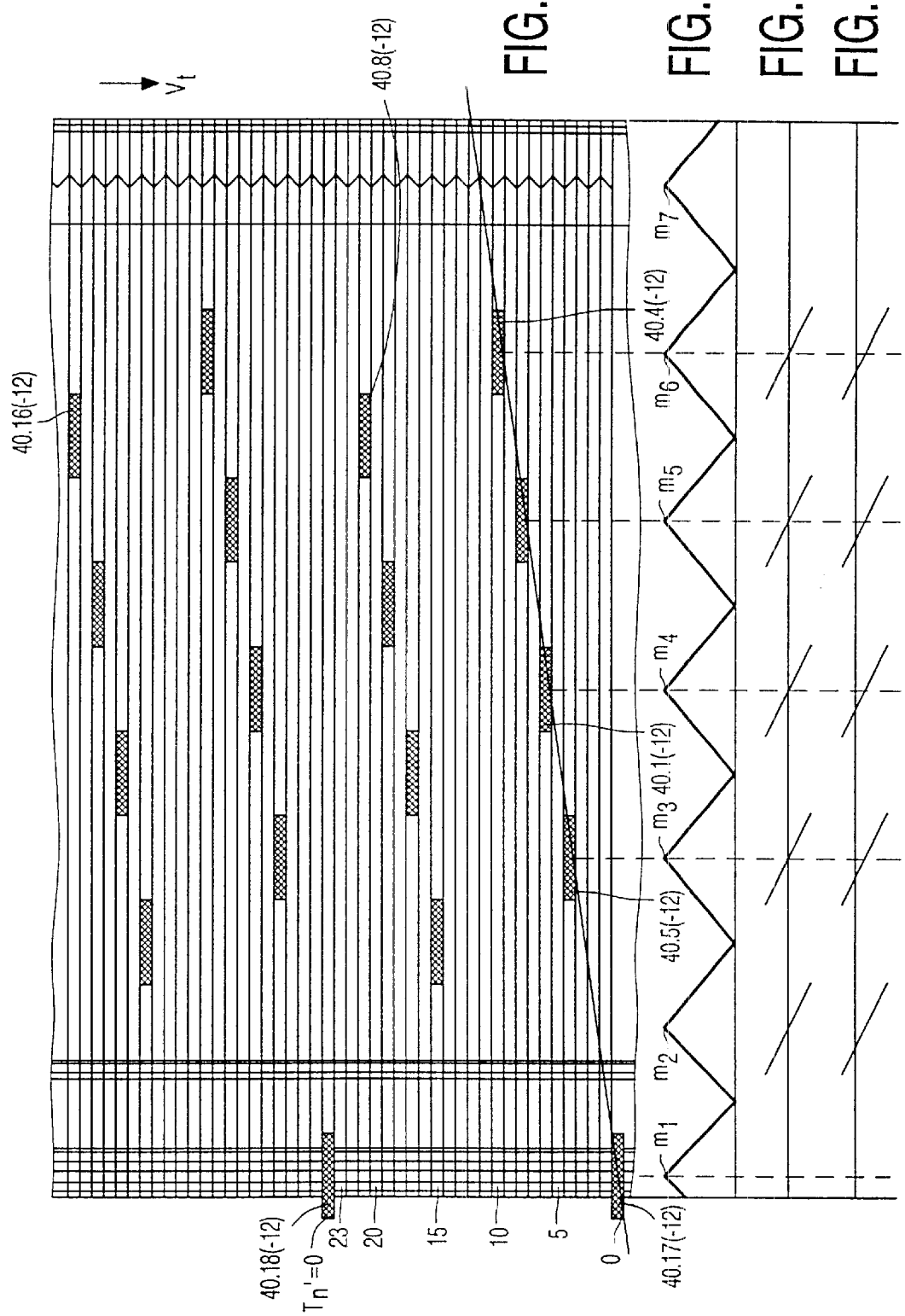

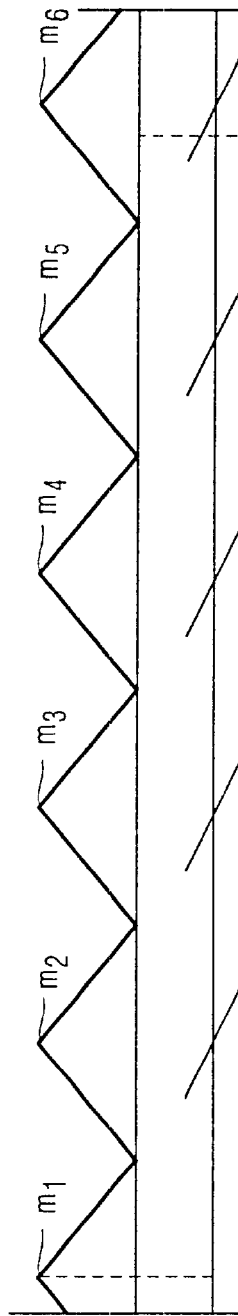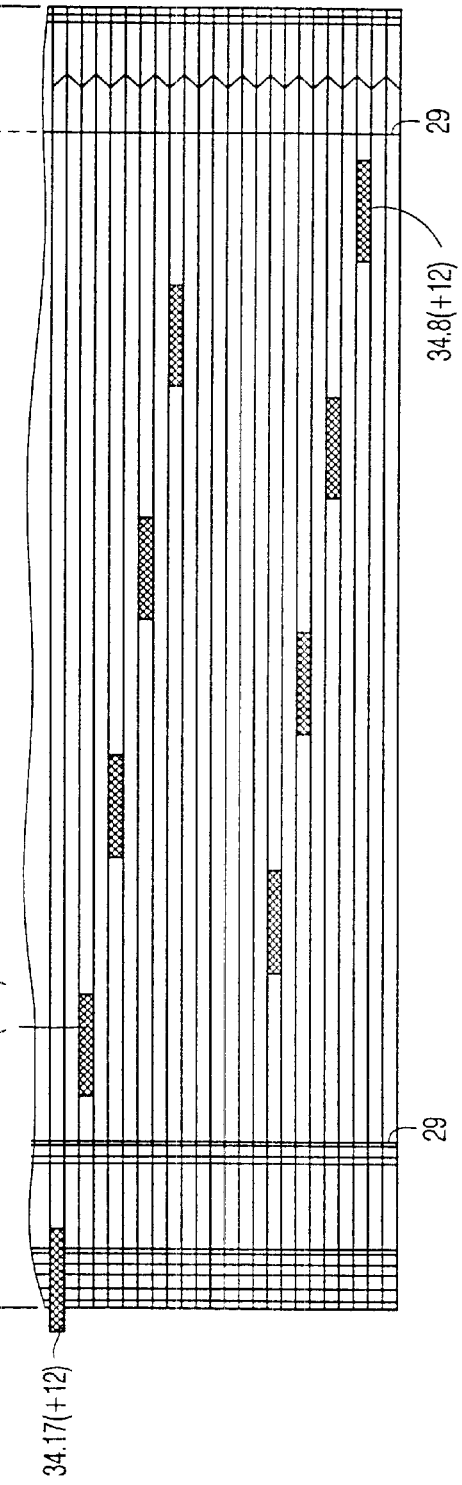
FIG. 17a
FIG. 17b
FIG. 17c
FIG. 17d
FIG. 17e

REPRODUCTION OF A DIGITAL INFORMATION SIGNAL IN A TRICK PLAY REPRODUCTION MODE

BACKGROUND OF THE INVENTION

1. Field of the Invention

The invention relates to an apparatus for reproducing a digital information signal recorded in slant tracks on a longitudinal record carrier in a trick play reproduction mode, the record carrier being transported in said trick play reproduction mode with a speed which equals n times a nominal reproduction speed, n being a constant larger than 1.

2. Description of the Related Art

Such an apparatus is known from U.S. Pat. No. 5,579,183, Document D1 in the List of Related Documents, and International Patent Application No. WO 95/28061, corresponding to U.S. Pat. Nos. 5,751,889 and 6,118,922, Document D2 in the List of Related Documents.

In order to scan the trick play segments as correctly as possible, a tracking control is present for controlling the record carrier transport speed in such a way that the scanning traces of the heads that scan the record carrier during successive revolutions of the head drum cross the trick play segments as accurately as possible.

SUMMARY OF THE INVENTION

An objection of the invention is to provide an improved tracking control during a trick play reproduction mode. The apparatus in accordance with the invention, for reproducing a first digital information signal recorded in slant tracks on a longitudinal record carrier in a trick play reproduction mode, the record carrier being transported in said trick play reproduction mode with a speed which equals n times a nominal reproduction speed, n being a constant whose magnitude is larger than 1, said tracks comprising a main signal recording portion in which sync blocks of information are recorded, the main signal recording portion comprising sync blocks having a portion of information of said first digital information signal stored in them and comprising sync blocks having a portion of a second digital information signal stored in them, said second digital information signal being a signal for reproduction in another reproduction mode, such as a reproduction mode with said nominal reproduction speed, said sync blocks of information further comprising:

track identification information, identifying the tracks in subsequent groups of a fixed number of subsequent tracks, sync block identification information, identifying the sync block in the sequence of sync blocks in said main signal recording portion of a track, said sync blocks comprising a portion of information of the first digital information signal being recorded in trick play segments located at various locations in said main signal recording portions in said tracks, the apparatus comprising:

read means for reading information from said record carrier, said read means comprising at least a first and a second read head having mutually different azimuth angles located on a rotatable head drum, transport means for transporting the record carrier with a specified speed, tracking control means for carrying out a tracking control during reproduction in said trick play reproduction mode in response to a tracking control signal, so as to enable reading of information from said trick play segments, the tracking control means comprising means for generating a tracking error signal from said track identification information and said sync block identification information, and means for deriving said tracking control signal from said tracking error signal, whereby the tracking control means is adapted to control the speed of the record carrier in such a way that the path that a head follows across the record carrier during one revolution of the head drum is controlled towards a reference path for said trick play reproduction mode across said record carrier, said reference path enabling optimal reproduction of information from said trick play segments for said trick play reproduction mode.

The invention is based on the recognition that tracking in a trick play reproduction mode should be realized on the basis of the track identification information and the sync block identification information comprised in the sync blocks present in the tracks. Those sync blocks need not necessarily be the sync blocks present in the trick play segments corresponding to the said trick play reproduction mode, but can be all the sync blocks present in the tracks. As a result, a very short lock-in time period is required to correctly track the heads on the trick play segments, this time period being defined as the time period between the time instant of switching the apparatus in the trick play reproduction mode and the instant that a picture is present on a TV screen.

BRIEF DESCRIPTION OF THE DRAWINGS

These and other aspects of the invention will be apparent from and elucidated with reference to the embodiments hereafter in the Figure description, in which:

FIGS. 14a–14d show the error signal obtained when reproducing information with the second head during a +12× trick play reproduction mode;

FIGS. 15a–15d show the error signals obtained when reproducing information with the first head during a −12× trick play reproduction mode;

FIGS. 17a–17e show the error signals obtained when reproducing the record carrier in a +12× trick play reproduction mode;

DESCRIPTION OF THE PREFERRED EMBODIMENTS

Figure 1:
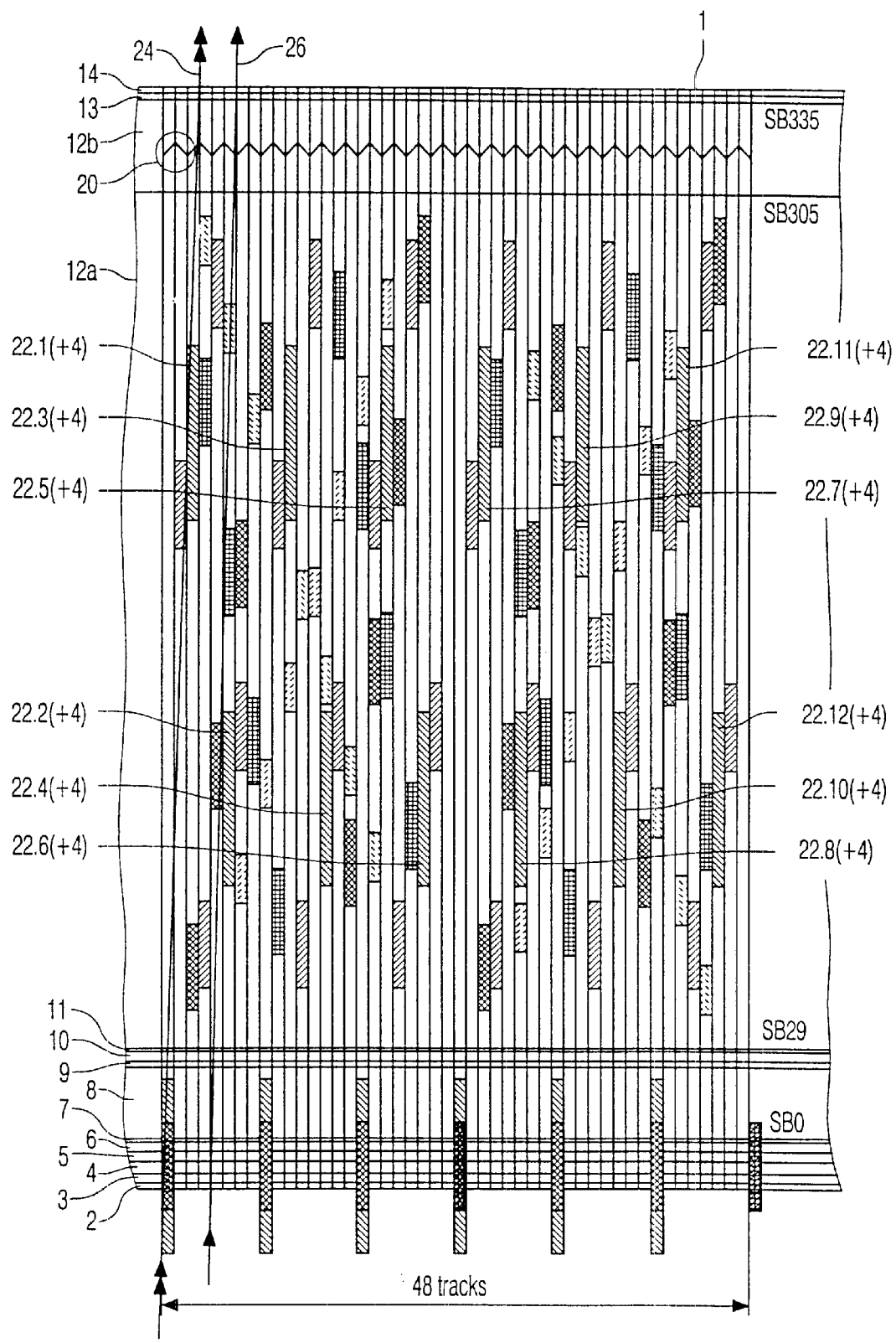
FIG. 1 shows the track format in a group of 48 tracks, and the paths across the record carrier that two reproduction heads follow during a first trick play reproduction mode, where the record carrier speed is +4 times nominal.

FIG. 1 shows the track format of the tracks recorded on the record carrier 1. The tracks are recorded at a slant angle with reference to the longitudinal direction of the record carrier. In FIG. 1, however, the tracks are shown, for clarity reasons, at an angle transverse to the longitudinal direction of the record carrier 1. Groups of p successive tracks can be identified on the record carrier 1. One such group of p successive tracks is shown in FIG. 1, where p is, in the present example, equal to 48. During recording/reproduction in the forward direction, the tracks are written/read in a direction from the bottom to the top of FIG. 1 and from left to right in the Figure. In the backwards direction, the tracks are read from the right to the left in the Figure.

Having subsequent groups of 48 tracks, the following dividends are possible as trick play speeds: 2×, 3×, 4×, 6×, 8×, 12× and 24×. The lowest two trick play speeds require a large amount of trick play data. Further, it is preferred to select trick play speeds that are integer multiples of each other. That results in either the trick play speeds 4×, 12× and 24×, or 6×, 12 and 24×. In the following, the set of trick play speeds 4×, 12× and 24×, and their reverse speeds will be further discussed.

Figure 2:
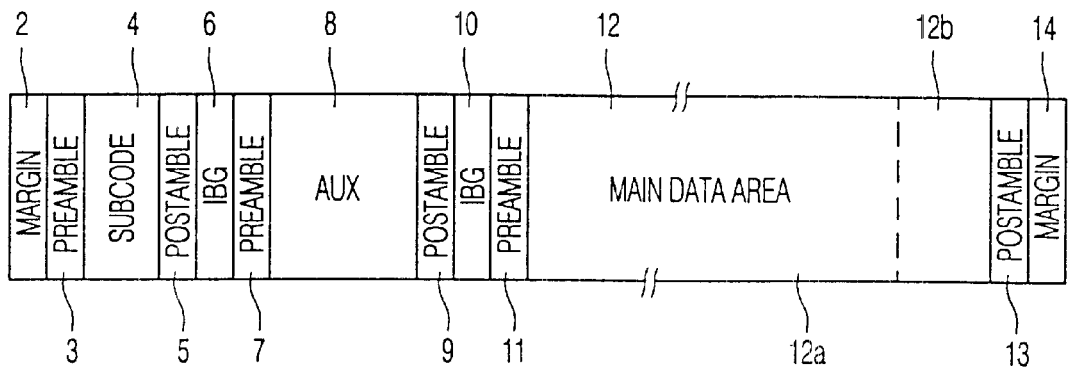
FIG. 2 shows the contents of a track on the record carrier.

FIG. 2 shows the format of one track. The track is recorded and read in a direction from left to right in the Figure. In the present example, the lengths of the various track portions in FIG. 2 are expressed in number of main sync blocks, where a main sync block has a length of 112 bytes of 8 bits each.

First, a clock run-in portion 2, denoted 'margin', is recorded, which, in the present example, is 2 main sync blocks long. Next, follows a preamble portion 3, which is 3 main sync blocks long. A sub-code signal recording portion 4 follows the preamble portion 3 and is 4 main sync blocks long. The sub-code signal recording portion 4 is meant to receive a sub-code signal. The sub-code signal can comprise, among others, absolute and/or relative time information and a table of contents.

Next, follows a postamble portion 5, which is 3 main sync blocks long, an edit gap 6, denoted 'IBG', which is 3 main sync blocks long, and a preamble portion 7, which is, in the present example, 1 main sync block long. Next, follows an auxiliary signal recording portion 8, denoted 'AUX', which is 23 main sync blocks long. The aux signal recording portion 8 is meant for recording an auxiliary signal, such as, text data, as an example. This aux signal recording portion 8 is followed by a postamble portion 9, which is 2 main sync blocks long, an edit gap 10, denoted 'IBG', which is 3 main sync blocks long and a preamble portion 11, which is 1 main sync block long. Next follows an information signal recording portion 12, denoted 'main data area', which is 307 main sync blocks long. The information signal recording portion 12 is meant to receive the digital information signals. One digital information signal can be a digital video signal and/or a digital audio signal, which may have been encoded into an MPEG information signal. Further, trick play data can be included in the information signal recording portion 12. The information signal recording portion 12 is fictively divided into two parts, a first part 12a, which is 277 main sync blocks long, and a second part 12b, which is 30 main sync blocks long. The second part 12b comprises outer ECC parity information.

The information signal recording portion 12 is followed by a postamble portion 13, which is 2 main sync blocks long, and another 'margin' portion 14, the length of which is not relevant, but can be assumed to be 2 main sync blocks long, for the present example. In total, the track thus comprises 356 main sync blocks.

It should be noted here, that the auxiliary signal recording portion 8 may be optional, in the sense that in another recording mode, no auxiliary signal is recorded in the tracks and the recording portion 8, including the portions 9, 10 and 11 are added to the information signal recording portion 12 and are filled with main information. In this other mode, however, no trick play data will be recorded in the portion of the track otherwise occupied by the portions 8, 9, 10 and 11.

Coming back to FIG. 1, the contents of the first part 12a of the information signal recording portion 12 will be further described. FIG. 1 shows tracks that have been recorded using at least a first and a second write head. The first head has a gap with a first azimuth angle and the second head has a gap with a second azimuth angle, which is different from the first azimuth angle. The tracks recorded by the first write head having the first azimuth angle are indicated by the slant line running from the bottom left corner of the figure to the top right corner of the figure, and the tracks recorded by the second write head having the second azimuth angle are indicated by the slant line running from the bottom right corner of the Figure to the top left corner of the figure, see the circle in FIG. 1 having the reference numeral 20.

A first information signal, which may comprise packets of information of an MPEG transport stream, is recorded in the tracks, more specifically, in the information signal recording portion 12 of the tracks. In an embodiment of the recording apparatus, which is in the form of a digital video recorder of the helical scan type, the first information signal could be 'normal play' data recorded in the tracks for reproduction in a reproducing apparatus at a record carrier speed which is the same as the record carrier speed during recording. This speed is defined as the nominal record carrier speed. The first information signal is accommodated in the main sync blocks, defined above.

Further, a second information signal has been recorded in specific segments in the tracks. Those segments are indicated in FIG. 1 by reference numerals 22.i(+4), where i runs from 1 to 12. This second information signal is meant for a reproduction in a reproduction apparatus at a reproduction speed which is 4 times the nominal reproduction speed in the forward direction. This second information signal could be an information signal which has no relationship whatsoever with the first information signal introduced above. Alternatively, the second information signal could have a relationship with the first information signal, in the sense that the second information signal is a trick play signal (defined from now on as the first trick play signal) for the 4 times nominal reproduction speed, in order to obtain a reproduced (video) signal, which is a replica of the reproduced first (video) signal, but reproduced at four times the nominal speed in the forward direction.

Figure 1A:
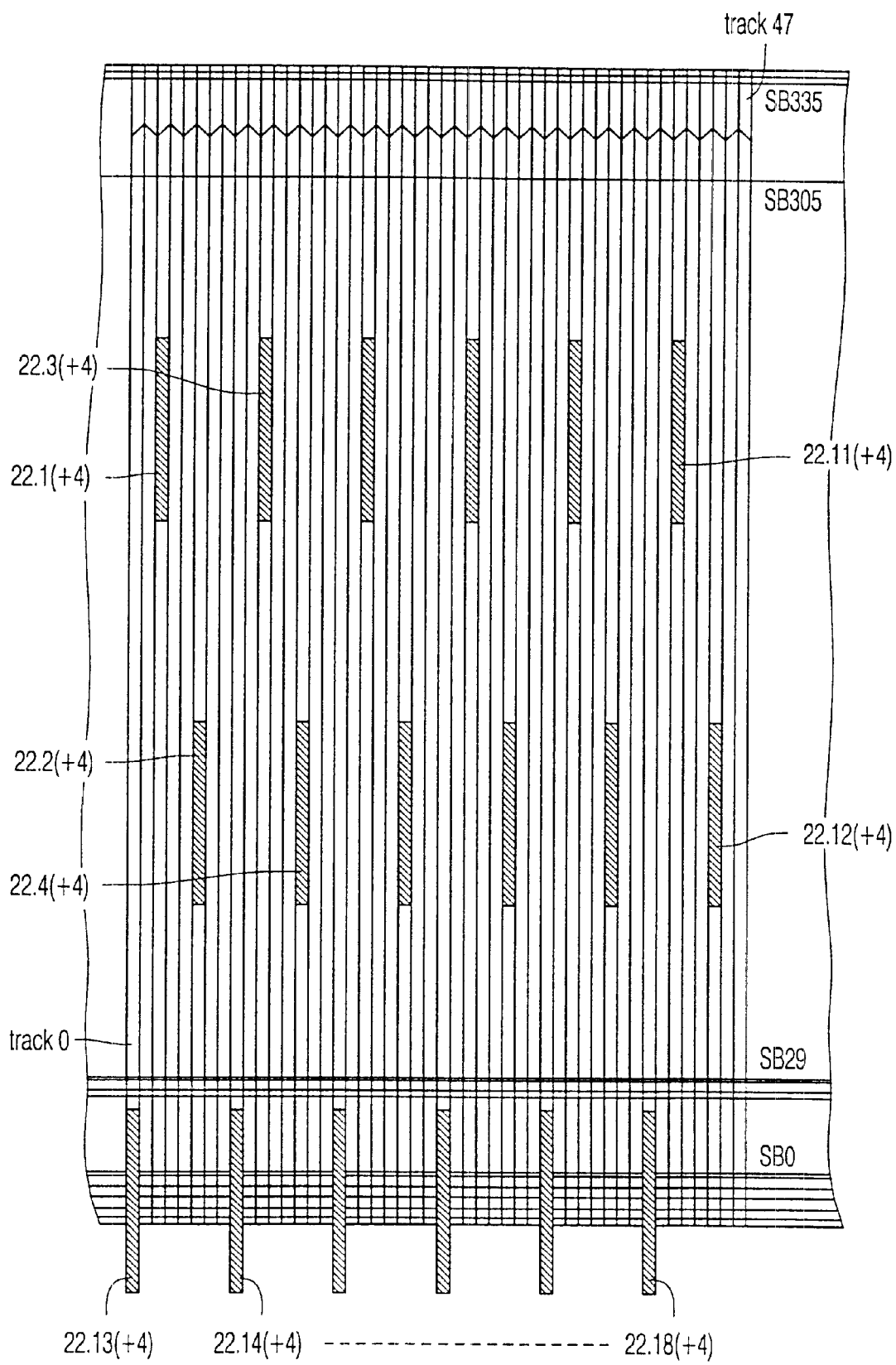
FIG. 1a shows the trick play segments for the +4 times nominal reproduction mode only, in the group of 48 tracks.

FIG. 1a shows the same group of 48 tracks as FIG. 1, however, only the 12 segments 22.i(+4) are shown in FIG. 1a. Assuming the track number of the first track in the group of 48 tracks to be track no. 0 and the track number of the last track in the group to be track number 47, the segments are recorded in the tracks with track number 2+n.8 and 5+n.8, where n is an integer running from 0 to 5 inclusive.

FIG. 1 further shows two scanning lines 24 and 26. The double-arrowed scanning line 24 shows the path that the one head, having the first azimuth angle, follows across the record carrier in the four times nominal reproduction mode, during one revolution of the head drum. The single-arrowed scanning line 26 shows the path that the other head, having the second azimuth angle, follows across the record carrier in the four times nominal reproduction mode during said one revolution of the head drum. As can be seen in FIG. 1, the one head reads the trick play segments 22.i(+4), where i is odd, and the other head thus reads the trick play segments 22.i(+4), where i is even.

The trick play segments 22.i(+4) each have a length of 56 main sync blocks, in the present example. From the 56 main sync blocks in one segment, 51 sync blocks have information contents as regards the trick play information stored in those sync blocks. The other five sync blocks in a segment comprise parity information, obtained from an ECC encoding step carried out on the trick play information. Thus, during each revolution of the head drum, during a four times nominal reproduction mode, 112 sync blocks of information of the first trick play signal, which include 10 sync blocks comprising parity information, are read from the record carrier. The parity sync blocks in a trick play segment are preferably stored last in a trick play segment When numbering the main sync blocks in a track, starting from 0, which is the first sync block in the aux recording area 8 in the track, until 305, which is the last sync block in the area 12a of the track, the sync blocks in the segments 22.i(+4), where i is even, are the sync blocks numbered 82 to 137, inclusive, in a track, where the sync blocks numbered 133 to 137, inclusive, are the sync blocks comprising the parity information. Further, the sync blocks in the segments 22.i(+4), where i is odd, are the sync blocks numbered 200 to 255, inclusive, in a track, where, again, the sync blocks numbered 251 to 255, inclusive, are the sync blocks comprising the parity information.

FIG. 1a further shows portions, numbered 22.13(+4) to 22.18(+4), located at the lower edge of some of the tracks in the group of 48 tracks. Those locations are locations that can be read in the +4 times nominal reproduction mode by one of the two heads, in the present case, the head having the first azimuth. As the locations shown include the sub-code signal recording portion, it is possible to read the information in the sub-code signal recording portion, also in the +4 times nominal reproduction mode.

Figure 3:
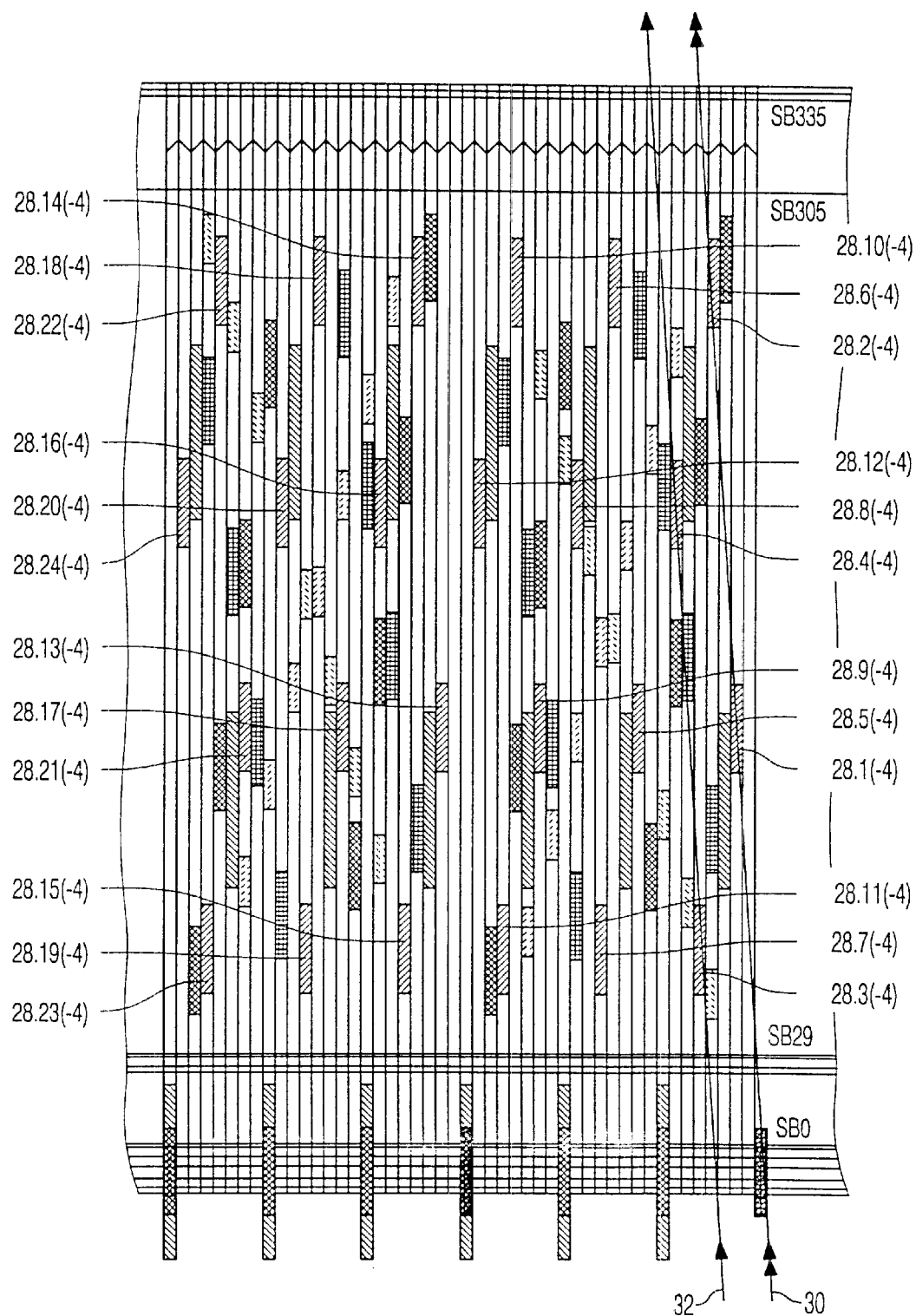
FIG. 3 shows the same format as FIG. 1, with the paths across the record carrier that the two reproduction heads follow during a second trick play reproduction mode, where the record carrier speed is −4 times nominal.

FIG. 3 shows a third information signal (from now on called: the second trick play signal) being recorded in specific segments in the tracks. Those segments are indicated in FIG. 3 by reference numerals 28.i(−4), where i runs from 1 to 24. This second trick play signal is meant for a reproduction in a reproduction apparatus at a reproduction speed which is 4 times the nominal reproduction speed in the backwards direction. This second trick play signal could be an information signal which has no relationship whatsoever with the signals introduced above. Alternatively, the second trick play signal could have a relationship with the first information signal, in the sense that the second trick play signal is a trick play signal for the minus 4 times nominal reproduction speed, in order to obtain a reproduced (video) signal, which is a replica of the reproduced first (video) signal, but reproduced at minus four times the nominal speed (in the backwards direction).

Figure 3A:
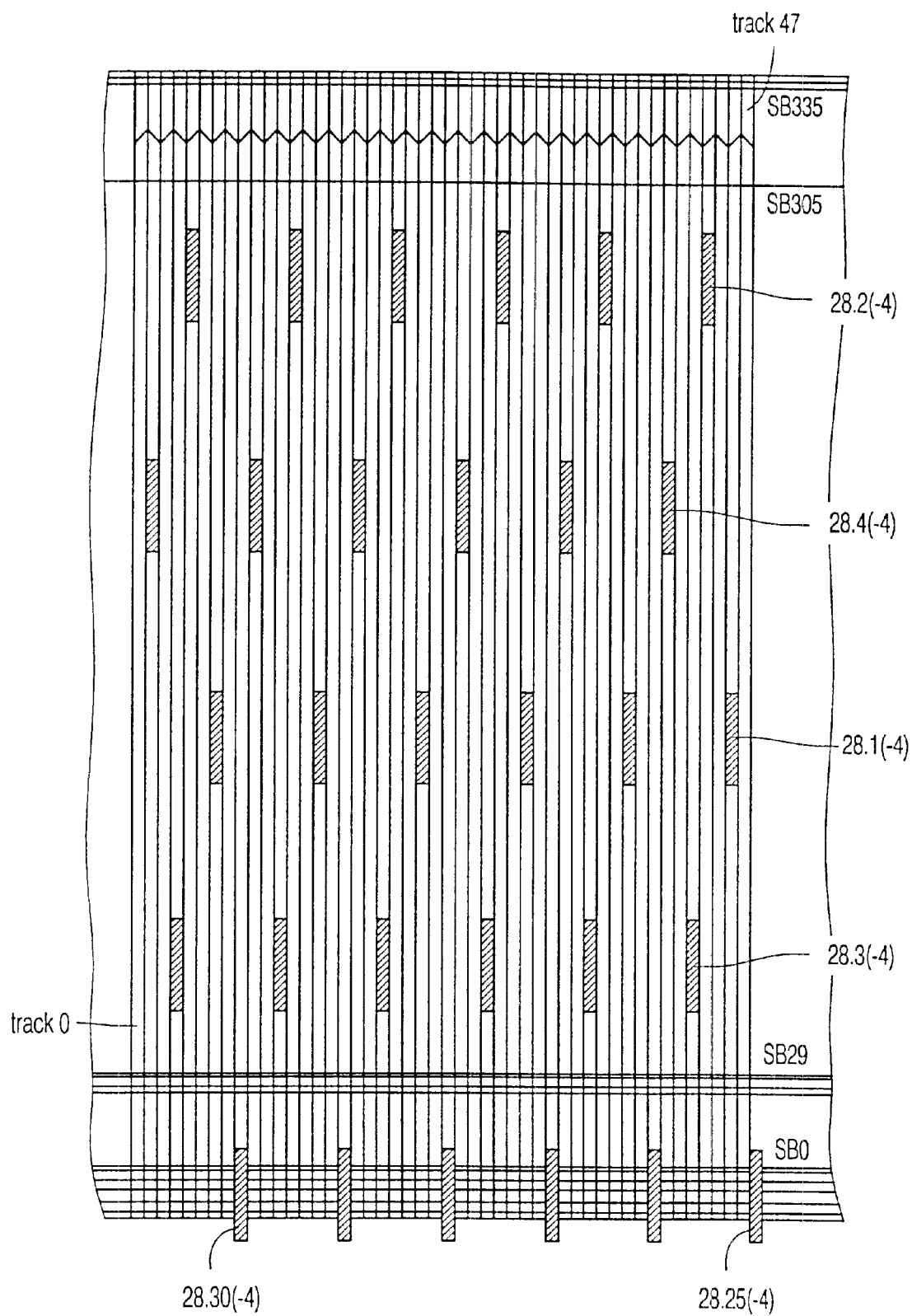
FIG. 3a shows the trick play segments for the −4 times nominal reproduction mode only, in the group of 48 tracks.

FIG. 3a shows the same group of 48 tracks as FIG. 3, however, only the 24 segments 28.i(−4) are shown in FIG. 3a. Assuming the track number of the first track in the group of 48 tracks to be track no. 0 and the track number of the last track in the group to be track number 47, the segments are recorded in the tracks with track number 1+n.8, 3+n.8, 4+n.8 and 6+n.8, where n is an integer running from 0 to 5 inclusive.

FIG. 3 further shows two scanning lines 30 and 32. The double-arrowed scanning line 30 shows the path that the one head, having the first azimuth angle, follows across the record carrier in the minus four times nominal reproduction mode, during one revolution of the head drum. The single-arrowed scanning line 32 shows the path that the other head, having the second azimuth angle, follows across the record carrier in the minus four times nominal reproduction mode during said one revolution of the head drum. As can be seen in FIG. 3, the one head reads the trick play segments 28.i(−4), where i equals 3, 4, 7, 8, 11, 12, 15, 16, 19, 20, 23 and 24, and the other head thus reads the trick play segments 28.j(−4), where j equals 1, 2, 5, 6, 9, 10, 13, 14, 17, 15 18, 21 and 22.

The trick play segments 28.i(−4) each have a length of 28 main sync blocks, in the present example. A trick play segment for the minus four times trick play speed comprises either 26 sync blocks having information contents as regards the trick play information stored in those sync blocks, and two sync blocks of parity information, or 25 sync blocks having each information contents as regards the trick play information stored in those sync blocks, and three sync blocks of parity information. Again, the parity information, stored in the sync blocks comprising the parity information, is obtained from an ECC encoding step carried out on the trick play signal. The parity sync blocks in a trick play segment are preferably stored last in a trick play segment.

The trick play segments for the minus 4 times nominal reproduction speed can be realized as explained in the following example. When numbering the main sync blocks, starting from 0, which is the first sync block in the aux recording area 8 in a track, until 305, which is the last sync block in the area 12*a* in the track, the sync blocks in the segments 28.i(−4), where i equals 1, 5, 9, 13, 17 and 21, are the sync blocks numbered 119 to 146, inclusive, in a track, where the sync blocks numbered 145 and 146 are the sync blocks comprising the parity information. Further, the sync blocks in the segments 28.j(−4), where j equals 2, 6, 10, 14, 18, and 22, are the sync blocks numbered 262 to 289, inclusive, in a track, where the sync blocks numbered 287, 288 and 289 are the sync blocks comprising the parity information. The sync blocks in the segments 28.k(−4), where k equals 3, 7, 11, 15, 19 and 23, are the sync blocks numbered 48 to 75, inclusive, in a track, where the sync blocks numbered 74 and 75 are the sync blocks comprising the parity information. Further, the sync blocks in the segments 28.1(−4), where l equals 4, 8, 12, 16, 20, and 24, are the sync blocks numbered 191 to 218, inclusive, in a track, where the sync blocks numbered 216, 217 and 218 are the sync blocks comprising the parity information.

Thus, during each revolution of the head drum, during a minus four times nominal reproduction mode, 112 sync blocks of information of the third information signal, 2×(26+2)+2×(25+3), are read from the record carrier, among which are 10 parity sync blocks. This is the same number of trick play sync blocks as for the 4 times reproduction mode.

FIG. 3*a* further shows portions, numbered 28.25(−4) to 28.30(−4), located at the lower edge of some of the tracks in the group of 48 tracks. Those locations are locations that can be read in the −4 times nominal reproduction mode by one of the two heads, in the present case, the head having the first azimuth. As the locations shown include the sub-code signal recording portion, it is possible to read the information in the sub-code signal recording portion, also in the −4 times nominal reproduction mode.

Figure 4:
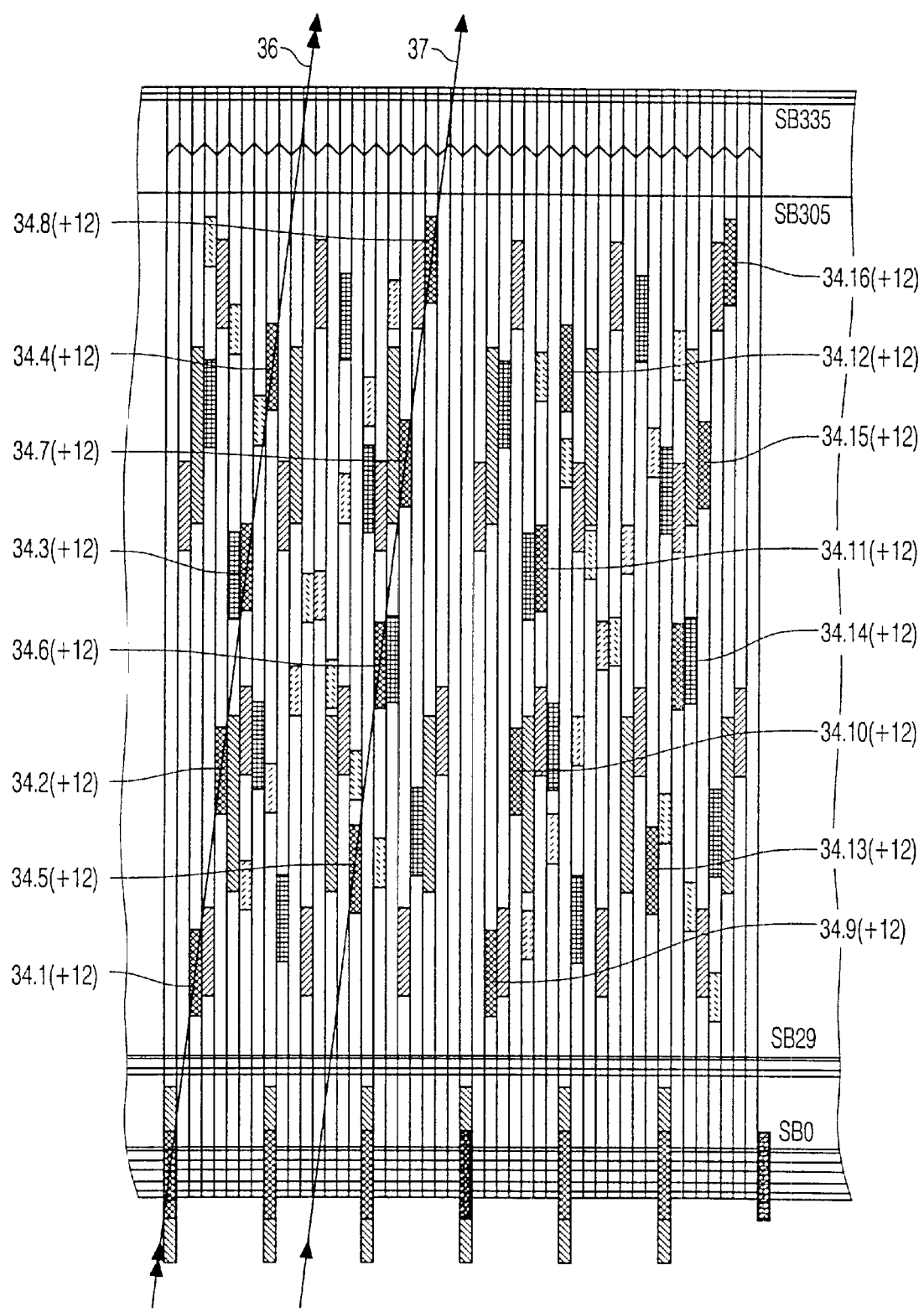
FIG. 4 shows the same format as FIG. 1, with the paths across the record carrier that the two reproduction heads follow during a third trick play reproduction mode, where the record carrier speed is +12 times nominal.

FIG. 4 shows a fourth information signal, which will be called the third trick play signal hereafter, being recorded in specific segments in the tracks. Those segments are indicated in FIG. 4 by reference numerals 34.i(+12), where i runs from 1 to 16. This third trick play signal is meant for a reproduction in a reproduction apparatus at a reproduction speed which is 12 times the nominal reproduction speed in the forward direction. This third trick play signal could be an information signal which has no relationship whatsoever with the signals introduced above. Alternatively, the third trick play signal could have a relationship with the first information signal, in the sense that the third trick play signal is a trick play signal for the 12 times nominal reproduction speed in the forward direction, in order to obtain a reproduced (video) signal, which is a replica of the reproduced first (video) signal, but reproduced at 12 times the nominal speed (in the forward direction).

Figure 4A:
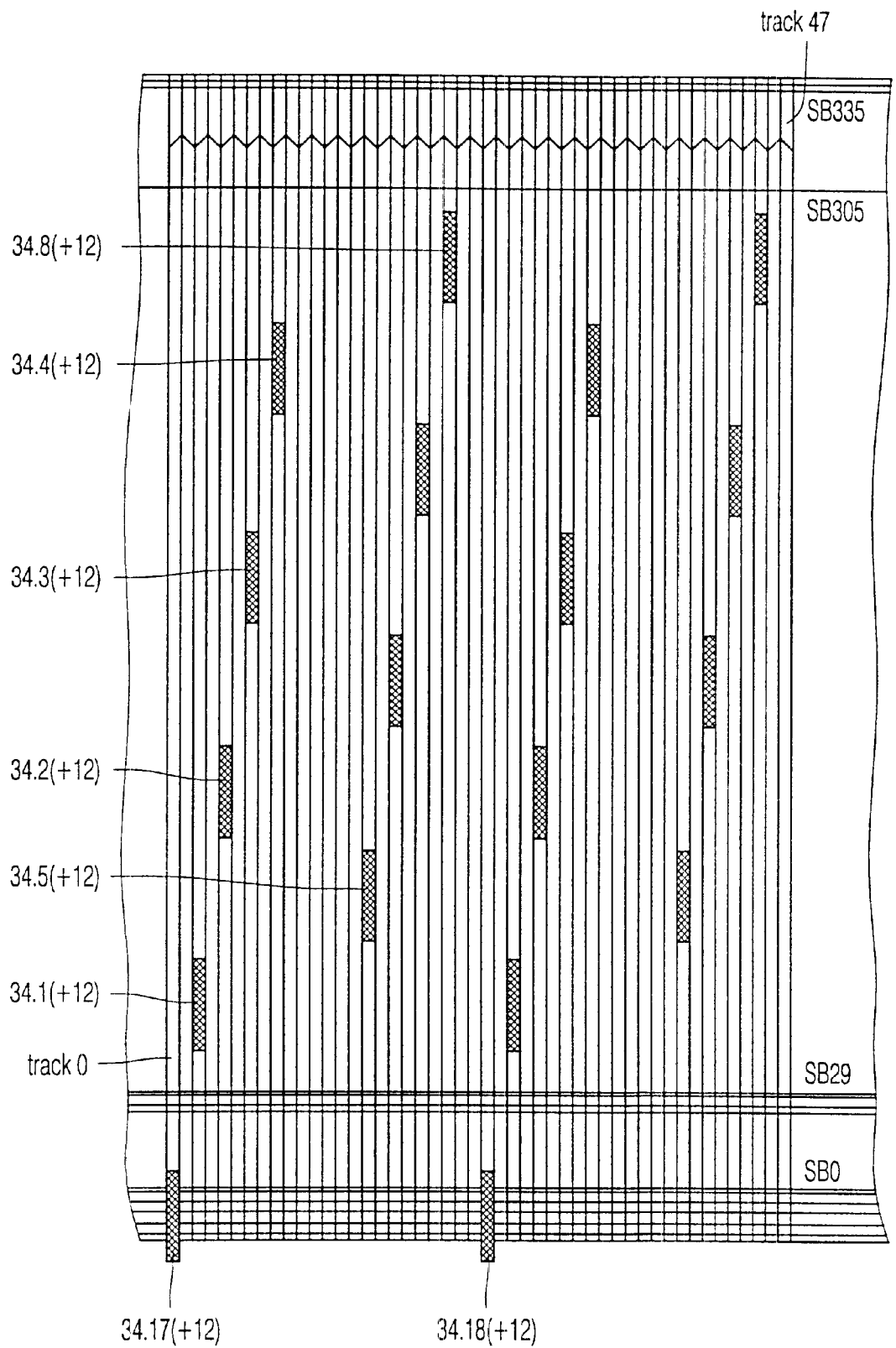
FIG. 4a shows the trick play segments for the +12 times nominal reproduction mode only, in the group of 48 tracks.

FIG. 4*a* shows the same group of 48 tracks as FIG. 4, however, only the 16 segments 34.i(+12) are shown in FIG. 4*a*. Assuming the track number of the first track in the group of 48 tracks to be track no. 0 and the track number of the last track in the group to be track number 47, the segments are recorded in the tracks with track number 2+n.2, 15+n.2, 26+n.2 and 39+n.2, where n is an integer running from 0 to 3 inclusive.

FIG. 4 further shows two scanning lines 36 and 37. The double-arrowed scanning line 36 shows the path that the one head, having the first azimuth angle, follow across the record carrier in the +12 times nominal reproduction mode, during one revolution of the head drum. The single-arrowed scanning line 37 shows the path that the other head, having the second azimuth angle, follows across the record carrier in the +12 times nominal reproduction mode during said one revolution of the head drum. As can be seen in FIG. 4, the one head reads the trick play segments 34.i(+12), where i equals 1 to 4, inclusive, and 9 to 12, inclusive, and the other head thus reads the trick play segments 34.j(+12), where j equals 5 to 8, inclusive, and 13 to 16, inclusive.

The trick play segments 34.i(+12) have a length of 28 main sync blocks, in the present example. Each trick play segment comprises 14 trick play sync blocks and repetitions of those 14 trick play sync blocks, resulting in the 28 sync blocks in each trick play segment.

In a group of 8 trick play segments read during one revolution of the head drum, six of them comprise two parity sync blocks per segment and the other two segments comprise 4 sync blocks per segment. These six segments thus each comprise 13 trick play sync blocks comprising information of the third trick play signal, 13 repetitions of those 13 trick play sync blocks, one parity sync block and one repetition of this parity sync block. The two remaining segments thus each comprise 12 trick play sync blocks comprising information of the third trick play signal, 12 repetitions of those 12 trick play sync blocks, two parity sync blocks and repetitions of those parity sync blocks.

The trick play segments for the +12 times nominal reproduction speed can be realized as explained in the following example. When, again, numbering the main sync blocks, starting from 0, which is the first sync block in the aux recording area 8 in a track, until 305, which is the last sync block in the area 12*a* in the track, the trick play sync blocks in the segments 34.1(+12) and 34.9(+12) are the sync blocks numbered 41 to 68, inclusive, in a track, where the sync blocks numbered 55 to 68, inclusive, are repetitions of the sync blocks numbered 41 to 54, inclusive. Further, the trick play sync blocks in the segments 34.1(+12) and 34.9(+12) numbered 54 and 68 are the parity sync blocks. The trick play sync blocks in the segments 34.2(+12) and 34.10(+12) are the sync blocks numbered 106 to 133, inclusive, where the sync blocks numbered 120 to 133, inclusive, are repetitions of the sync blocks numbered 106 to 119, inclusive. The trick play sync blocks numbered 119 and 133 are the parity sync blocks in the segments. The trick play sync blocks in the segments 34.3(+12) and 34.11(+12) are the sync blocks numbered 171 to 198, inclusive, in a track, where the sync blocks numbered 185 to 198, inclusive, are repetitions of the sync blocks numbered 171 to 184, inclusive. The trick play sync blocks numbered 184 and 198 are the parity sync blocks.

Further, the trick play sync blocks in the segments 34.4 (+12) and 34.12(+12) are the sync blocks numbered 236 to 263, inclusive, in a track, where the sync blocks numbered 250 to 263, inclusive, are repetitions of the sync blocks numbered 236 to 249, inclusive. The trick play sync blocks numbered 248, 249, 262 and 263 are the parity sync blocks.

The trick play sync blocks in the segments 34.5(+12) and 34.13(+12) are the sync blocks numbered 74 to 101, inclusive, in a track, where the sync blocks numbered 88 to 101, inclusive, are repetitions of the sync blocks numbered 74 to 87, inclusive. The trick play sync blocks numbered 87 and 101 are the parity sync blocks. Further, the trick play sync blocks in the segments 34.6(+12) and 34.14(+12) are the sync blocks numbered 139 to 166, inclusive, in a track, where the sync blocks numbered 153 to 166, inclusive, are repetitions of the sync blocks numbered 139 to 152, inclusive. The trick play sync blocks numbered 152 and 166 are the parity sync blocks. The trick play sync blocks in the segments 34.7(+12) and 34.15(+12) are the sync blocks numbered 204 to 231, inclusive, in a track, where the sync blocks numbered 218 to 231, inclusive, are repetitions of the sync blocks numbered 204 to 217, inclusive. The trick play sync blocks numbered 217 and 231 are the parity sync blocks. Further, the trick play sync blocks in the segments 34.8(+12) and 34.16(+12) are the sync blocks numbered 269 to 296, inclusive, in a track, where the sync blocks numbered 283 to 296, inclusive, are repetitions of the sync blocks numbered 269 to 282, inclusive. The trick play sync blocks numbered 281, 282, 295 and 296 are the parity sync blocks in the segments.

Thus, during each revolution of the head drum, during a +12 times nominal reproduction mode, 224 sync blocks (8×28) of the third trick play signal are read from the record carrier.

FIG. 4a further shows portions, numbered 34.17(+12) and 34.18(+12), located at the lower edge of some of the tracks in the group of 48 tracks. Those locations are locations that can be read in the +12 times nominal reproduction mode by one of the two heads, in the present case, the head having the first azimuth. As the locations shown include the sub-code signal recording portion, it is possible to read the information in the sub-code signal recording portion, also in the +12 times nominal reproduction mode.

Figure 5:
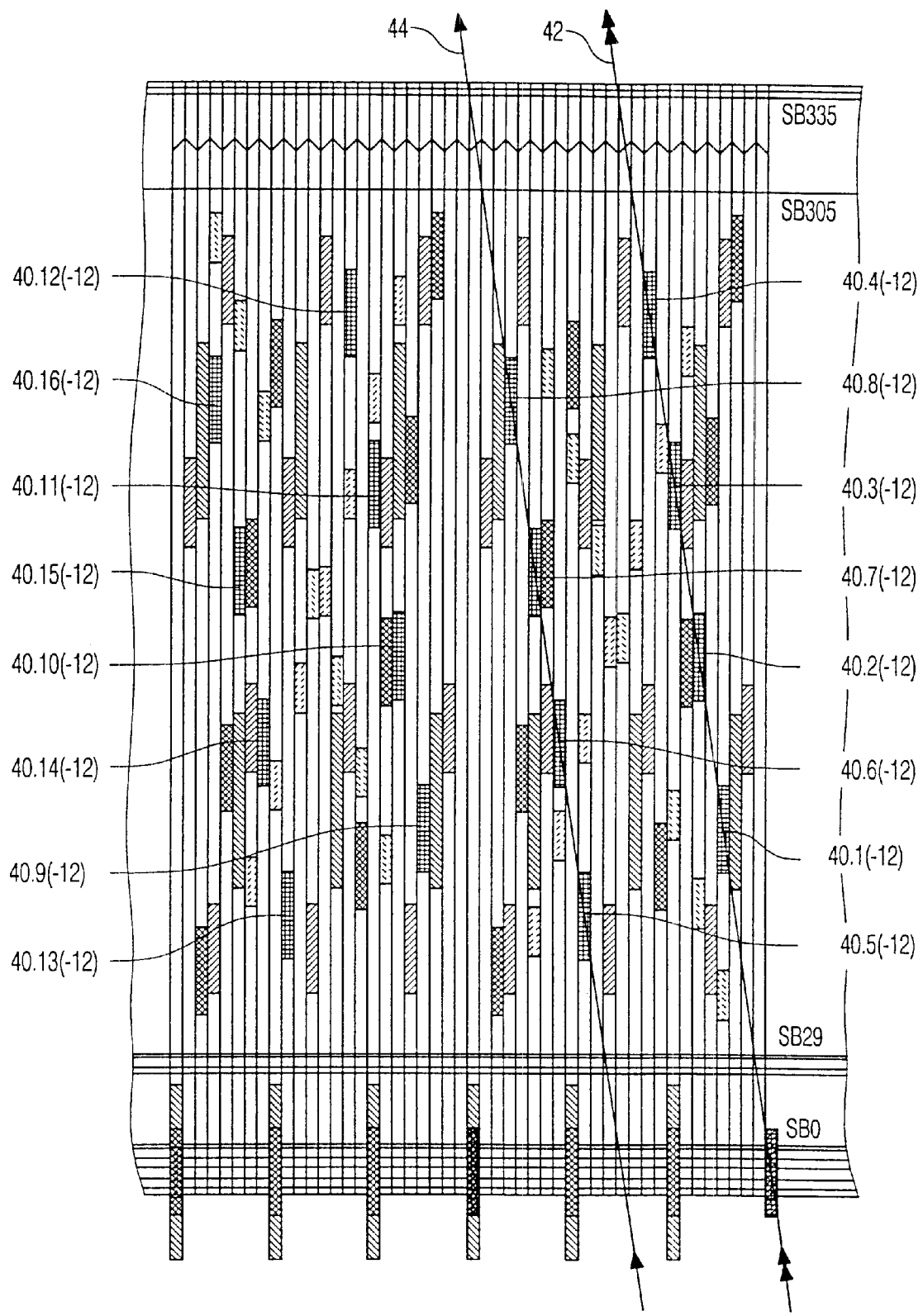
FIG. 5 shows the same format as FIG. 1, with the paths across the record carrier that the two reproduction heads follow during a fourth trick play reproduction mode, where the record carrier speed is −12 times nominal.

FIG. 5 shows a fifth information signal being recorded in specific segments in the tracks. This information signal will be called the fourth trick play signal from now on. The segments are indicated in FIG. 5 by reference numerals 40.i(−12), where i runs from 1 to 16. This fourth trick play signal is meant for a reproduction in a reproduction apparatus at a reproduction speed which is minus 12 times the nominal reproduction speed (that is: in the backwards direction). This fourth trick play signal could be an information signal which has no relationship whatsoever with the signals introduced above. Alternatively, the fourth information signal could have a relationship with the first information signal, in the sense that the fourth trick play signal is a trick play signal for the minus 12 times nominal reproduction speed, in order to obtain a reproduced (video) signal, which is a replica of the reproduced first (video) signal, but reproduced at minus 12 times the nominal speed (in the backwards direction).

Figure 5A:
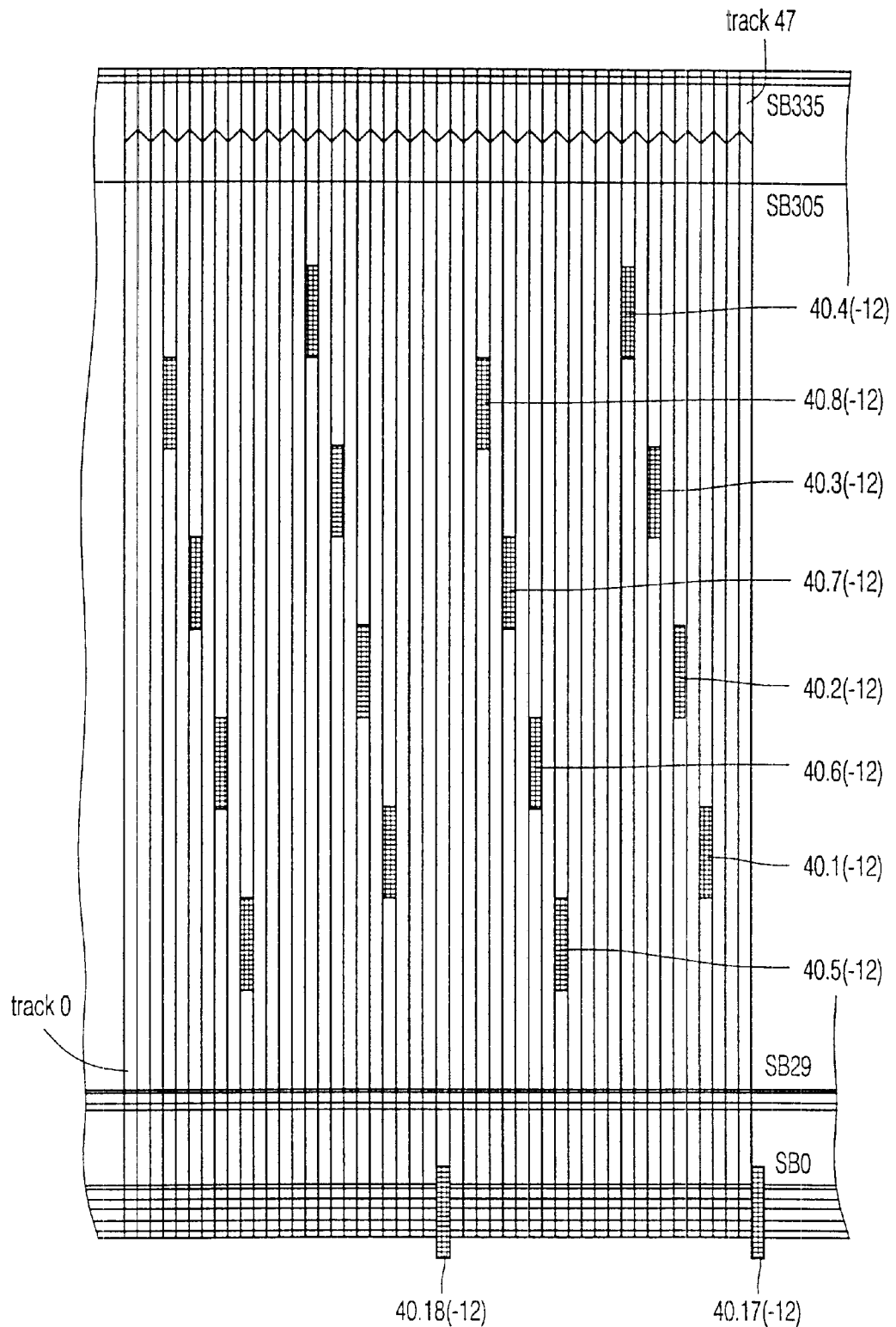
FIG. 5a shows the trick play segments for the −12 times nominal reproduction mode only, in the group of 48 tracks.

FIG. 5a shows the same group of 48 tracks as FIG. 5, however, only the 16 segments 40.i(−12) are shown in FIG. 5a. Assuming the track number of the first track in the group of 48 tracks to be track no. 0 and the track number of the last track in the group to be track number 47, the segments are recorded in the tracks with track number 3+n.2 and 27+n.2, where n is an integer running from 0 to 3 and in tracks with track numbers 14+n.2 and 38+n.2, where n is an integer running from 0 to 3, inclusive.

FIG. 5 further shows two scanning lines 42 and 44. The double-arrowed scanning line 42 shows the path that the one head, having the first azimuth angle, follow across the record carrier in the −12 times nominal reproduction mode, during one revolution of the head drum. The single-arrowed scanning line 44 shows the path that the other head, having the second azimuth angle, follow across the record carrier in the −12 times nominal reproduction mode during said one revolution of the head drum. As can be seen in FIG. 5, the one head reads the trick play segments 40.i(−12), where i equals 1 to 4, inclusive (and also 9 to 12, inclusive), and the other head thus reads the trick play segments 40.j(−12), where j equals 5 to 8, inclusive, and 13 to 16, inclusive.

The trick play.segments 40.i(−12) each have a length of 28 main sync blocks. As in the +12× trick play situation, in a group of 8 trick play segments read during one revolution of the head drum, six of them comprise two parity sync blocks per segment and the other two segments comprise 4 sync blocks per segment. These six segments thus each comprise 13 trick play sync blocks comprising information of the third trick play signal, 13 repetitions of those 13 trick play sync blocks, one parity sync block and one repetition of this parity sync block. The two remaining segments thus each comprise 12 trick play sync blocks comprising information of the third trick play signal, 12 repetitions of those 12 trick play sync blocks, two parity sync blocks and repetitions of those parity sync blocks.

The trick play segments for the −12 times nominal reproduction speed can be realized as explained in the following example. When, again, numbering the main sync blocks, starting from 0, which is the first sync block in the aux recording area 8 in a track, until 305, which is the last sync block in the area 12a in the track, the sync blocks in the segments 40.1(−12) and 40.9(−12) are the sync blocks numbered 86 to 113, inclusive, in a track, where the sync blocks numbered 100 to 113, inclusive, are repetitions of the sync blocks numbered 86 to 99, inclusive. The trick play sync block numbers in the segments numbered 99 and 113 are the parity sync blocks. Further, the sync blocks in the segments 40.2(−12) and 40.10(−12) are the sync blocks numbered 141 to 168, inclusive, in a track, where the sync blocks numbered 155 to 168, inclusive, are repetitions of the sync blocks numbered 141 to 154, inclusive. The sync blocks numbered 154 and 168 are the parity sync blocks in the segments. The sync blocks in the segments 40.3(−12) and 40.11(−12) are the sync blocks in a track numbered 196 to 223, inclusive, where the sync blocks numbered 210 to 223, inclusive, are repetitions of the sync blocks numbered 196 to 209, inclusive. The sync blocks numbered 209 and 223 are the parity sync blocks in the segments. Further, the sync blocks in the segments 40.4(−12) and 40.12(−12) are the sync blocks in a track numbered 251 to 278, inclusive, where the sync blocks numbered 265 to 278, inclusive, are repetitions of the sync blocks numbered 251 to 264, inclusive. The sync blocks numbered 263, 264, 277 and 278 are the parity sync blocks in the segments.

The sync blocks in the segments 40.5(−12) and 40.13(−12) are the sync blocks in a track numbered 59 to 86, inclusive, where the sync blocks numbered 73 to 86, inclusive, are repetitions of the sync blocks numbered 59 to 72, inclusive. The sync blocks numbered 72 and 86 are the parity sync blocks. Further, the sync blocks in the segments 40.6(−12) and 40.14(−12) are the sync blocks in a track numbered 114 to 141, inclusive, where the sync blocks numbered 128 to 141, inclusive, are repetitions of the sync blocks numbered 114 to 127, inclusive. The sync blocks numbered 127 and 141 are the parity sync blocks. The sync blocks in the segments 40.7(−12) and 40.15(−12) are the sync blocks in a track numbered 169 to 196, inclusive, where the sync blocks numbered 183 to 196, inclusive, are repetitions of the sync blocks numbered 169 to 182, inclusive. The sync blocks numbered 182 and 196 are the parity sync blocks. Further, the sync blocks in the segments 40.8(−12) and 40.16(−12) are the sync blocks in a track numbered 224 to 251, inclusive, where the sync blocks numbered 238 to 251, inclusive, are repetitions of the sync blocks numbered 224 to 237, inclusive. The sync blocks numbered 236, 237, 250 and 251 are the parity sync blocks in the segments.

Thus, during each revolution of the head drum, during a −12 times nominal reproduction mode, 224 sync blocks (8×28 sync blocks) of information of the fourth trick play signal are read from the record carrier, which is the same number of sync blocks as for the +12× reproduction mode.

FIG. 5a further shows portions, numbered 40.17(−12) and 40.18(−12), located at the lower edge of some of the tracks in the group of 48 tracks. These locations are locations that can be read in the −12 times nominal reproduction mode by one of the two heads, in the present case, the head having the first azimuth. As the locations shown include the sub-code signal recording portion, it is possible to read the information in the sub-code signal recording portion, also in the −12 times nominal reproduction mode.

Figure 6:
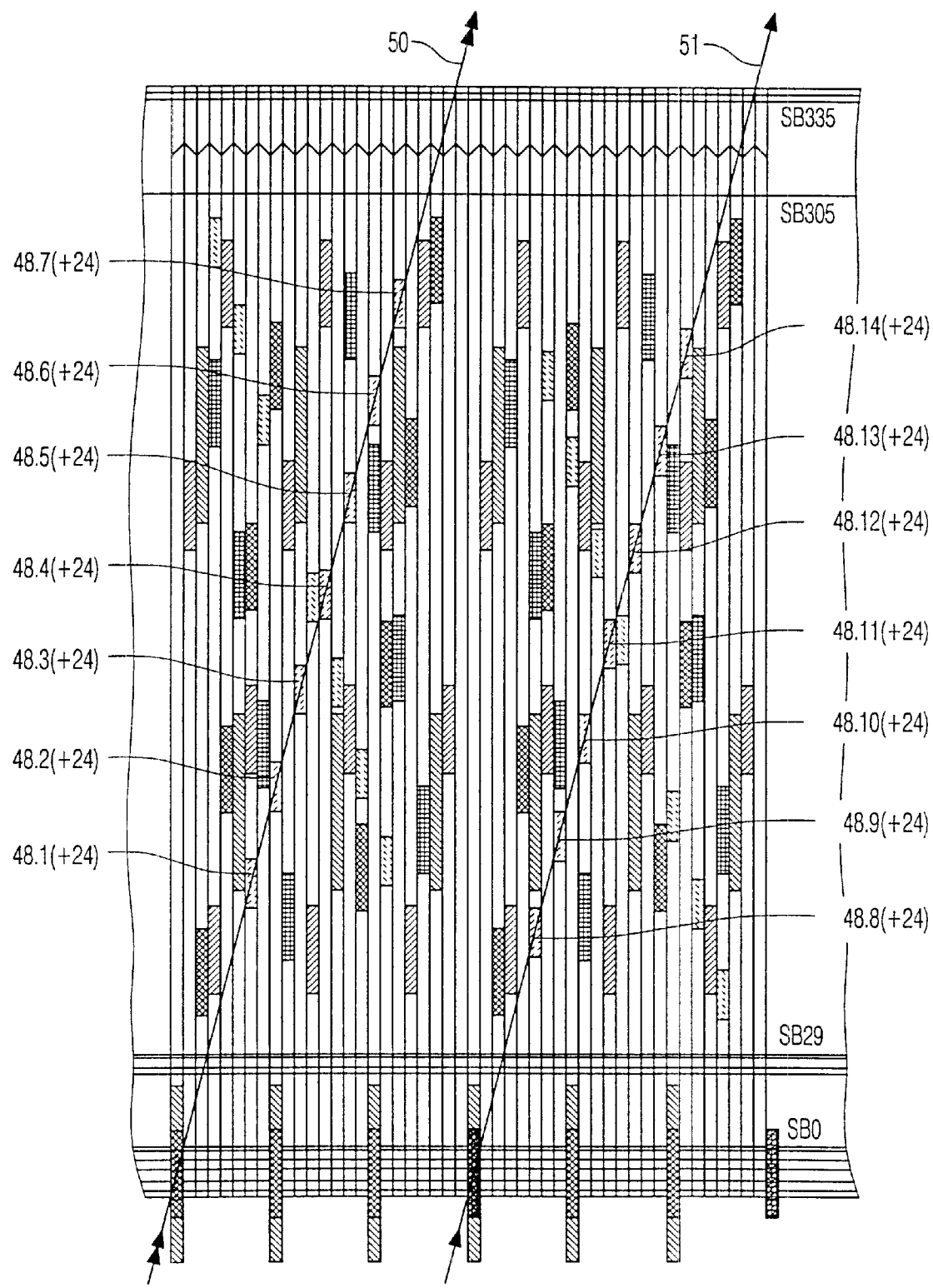
FIG. 6 shows the same format as FIG. 1, with the paths across the record carrier that the two reproduction heads follow during a fifth trick play reproduction mode, where the record carrier speed is +24 times nominal.

FIG. 6 shows a sixth information signal being recorded in specific segments in the tracks. This signal will be defined as the fifth trick play signal hereafter. The segments are indicated in FIG. 6 by reference numerals 48.i(+24), where i runs from 1 to 14. This fifth trick play signal is meant for a reproduction in a reproduction apparatus at a reproduction speed which is +24 times the nominal reproduction speed (that is: in the forward direction). This fifth trick play signal could be an information signal which has no relationship whatsoever with the signals introduced earlier. Alternatively, the fifth trick play signal could have a relationship with the first information signal, in the sense that the fifth trick play signal is a trick play signal for the +24 times nominal reproduction speed, in order to obtain a reproduced (video) signal, which is a replica of the reproduced first (video) signal, but reproduced at +24 times the nominal speed.

Figure 6A:
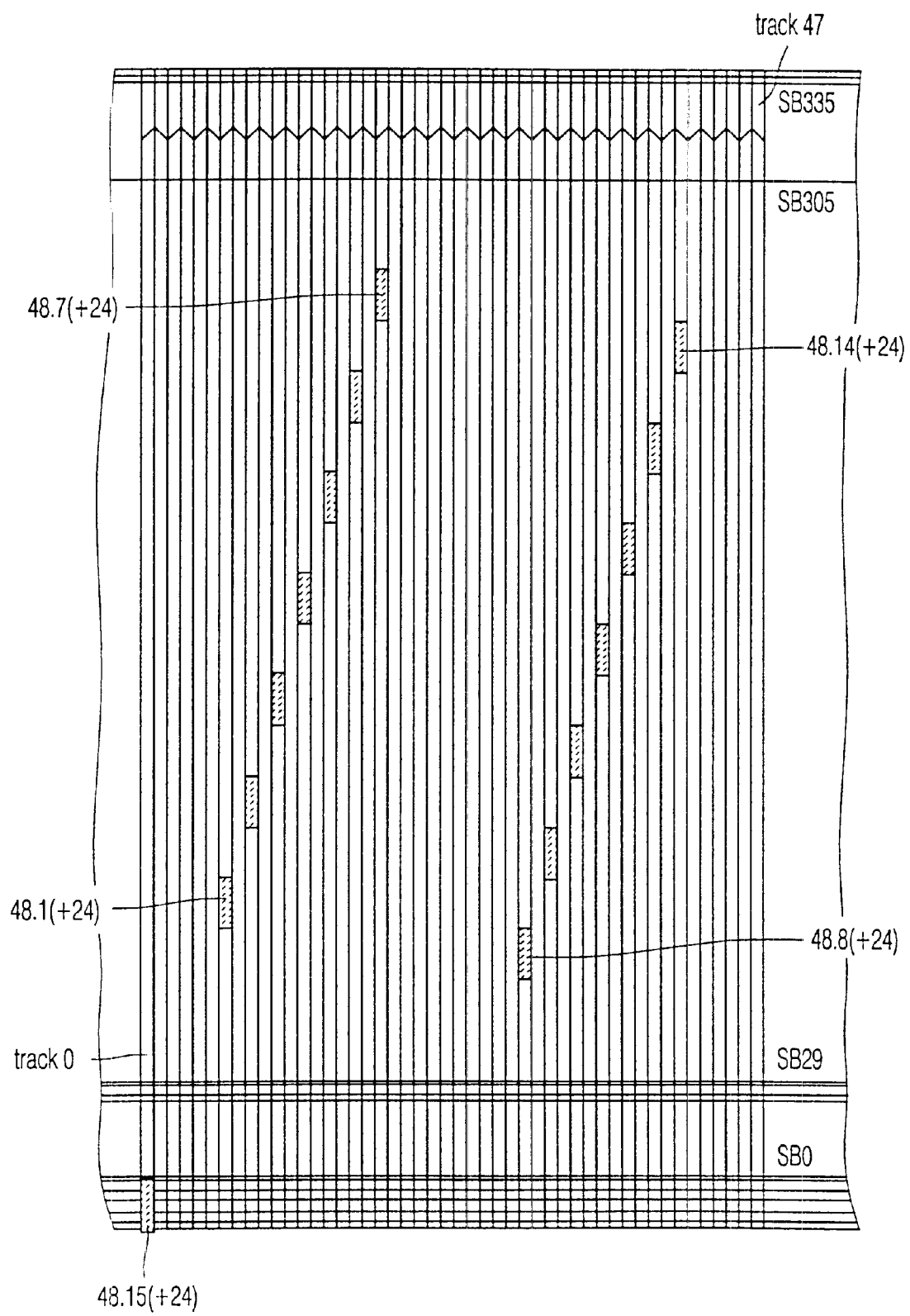
FIG. 6a shows the trick play segments for the +24 times nominal reproduction mode only, in the group of 48 tracks.

FIG. 6a shows the same group of 48 tracks as FIG. 6, however, only the 14 segments 48.i(+24) are shown in FIG. 6a. Assuming the track number of the first track in the group of 48 tracks to be track no. 0 and the track number of the last track in the group to be track number 47, the segments are recorded in the tracks with track number 6+n.2 and 29+n.2, where n is an integer running from 0 to 6, inclusive.

FIG. 6 further shows two scanning lines 50 and 51. The double-arrowed scanning line 50 shows the path that the one head, having the first azimuth angle, follows across the record carrier in the +24 times nominal reproduction mode, during one revolution of the head drum. The single-arrowed scanning line 51 shows the path that the other head, having the second azimuth angle, follows across the record carrier in the +24 times nominal reproduction mode during said one revolution of the head drum. As can be seen in FIG. 6, the one head reads the trick play segments 48.i(+24), where i equals 1 to 7, inclusive, and the other head thus reads the trick play segments 48.j(+24), where j equals 8 to 14, inclusive.

The trick play segments 48.i(+24) each have a length of 16 main sync blocks, in the present example. In the group of 14 trick play segments, four of them each comprise 8 trick play sync blocks of information of the fifth trick play signal and repetitions of those 8 sync blocks. The remaining 10 trick play sync blocks in the group comprise 7 trick play sync blocks of information of the fifth trick play signal, 1 parity sync block and one repetition of both the 7 trick play sync blocks and the parity sync block.

The trick play segments for the +24 times nominal reproduction speed can be realized as explained in the following example. When, again, numbering the main sync blocks, starting from 0, which is the first sync block in the aux recording area 8 in a track, until 305, which is the last sync block in the area 12a in the track, the sync blocks in the segment 48.1(+24) are the sync blocks in a track numbered 76 to 91, inclusive, where the sync blocks numbered 84 to 91, inclusive, are repetitions of the sync blocks 76 to 83, inclusive. No parity sync blocks are present in this segment. The sync blocks in the segment 48.2(+24) are the sync blocks in a track numbered 107 to 122, inclusive, where the sync blocks numbered 115 to 122, inclusive, are repetitions of the sync blocks numbered 107 to 114, inclusive. The sync blocks numbered 114 and 122 are the parity sync blocks in the segment. The sync blocks in the segment 48.3(+24) are the sync blocks in a track numbered 138 to 153, inclusive, where the sync blocks numbered 146 to 153, inclusive, are repetitions of the sync blocks 138 to 145, inclusive. The sync blocks numbered 145 and 153 are the parity sync blocks in the segment. The sync blocks in the segment 48.4(+24) are the sync blocks in a track numbered 169 to 184, inclusive, where the sync blocks numbered 177 to 184, inclusive, are repetitions of the sync blocks numbered 169 to 176, inclusive. The sync blocks numbered 176 and 184 are the parity sync blocks in the segment. The sync blocks in the segment 48.5(+24) are the sync blocks in a track numbered 200 to 215, inclusive, where the sync blocks numbered 208 to 215, inclusive, are repetitions of the sync blocks 200 to 207, inclusive. The sync blocks numbered 207 and 215 are the parity sync blocks in the segment. The sync blocks in the segment 48.6(+24) are the sync blocks in a track numbered 231 to 246, inclusive, where the sync blocks numbered 239 to 246, inclusive, are repetitions of the sync blocks numbered 231 to 238, inclusive. The sync blocks numbered 238 and 246 are the parity sync blocks in the segment. Further, the sync blocks in the segment 48.7(+24) are the sync blocks in a track numbered 262 to 277, inclusive, where the sync blocks numbered 270 to 277, inclusive, are repetitions of the sync blocks 262 to 269, inclusive. No parity sync blocks are present in the segment.

The sync blocks in the segment 48.8(+24) are the sync blocks in a track numbered 60 to 75, inclusive, where the sync blocks numbered 68 to 75, inclusive, are repetitions of the sync blocks numbered 60 to 67, inclusive. No parity sync blocks are present in the segment. The sync blocks in the segment 48.9(+24) are the sync blocks in a track numbered 91 to 106, inclusive, where the sync blocks numbered 99 to 106, inclusive, are repetitions of the sync blocks numbered 91 to 98, inclusive. The sync blocks numbered 98 and 106 are the parity sync blocks in the segment. The sync blocks in the segment 48.10(+24) are the sync blocks in a track numbered 122 to 137, inclusive, where the sync blocks numbered 130 to 137, inclusive, are repetitions of the sync blocks numbered 122 to 129, inclusive. The sync blocks numbered 129 and 137 are the parity sync blocks in the segment. The sync blocks in the segment 48.11(+24) are the sync blocks in a track numbered 153 to 168, inclusive, where the sync blocks numbered 161 to 168, inclusive, are repetitions of the sync blocks numbered 153 to 160, inclusive. The sync blocks numbered 160 and 168 are the parity sync blocks in the segment. The sync blocks in the segment 48.12(+24) are the sync blocks in a track numbered 184 to 199, inclusive, where the sync blocks numbered 192 to 199, inclusive, are repetitions of the sync blocks numbered 184 to 191, inclusive. The sync blocks numbered 191 and 199 are the parity sync blocks in the segment. The sync blocks in the segment 48.13(+24) are the sync blocks in a track numbered 215 to 230, inclusive, where the sync blocks numbered 223 to 230, inclusive, are repetitions of the sync blocks numbered 215 to 222, inclusive. The sync blocks numbered 222 and 230 are the parity sync blocks in the segment. The sync blocks in the segment 48.14(+24) are the sync blocks in a track numbered 246 to 261, inclusive, where the sync blocks numbered 254 to 261, inclusive, are repetitions of the sync blocks numbered 246 to 253, inclusive. No parity sync blocks are present in the segment.

Thus, during each revolution of the head drum, during a +24 times nominal reproduction mode, 224 sync blocks (14×16 sync blocks) of information of the fifth trick play signal are read from the record carrier.

FIG. 6a further shows a portion, numbered 48.15(+24), located at the lower edge of one of the tracks in the group of 48 tracks. This location is a location that can be read in the +24 times nominal reproduction mode by one of the two heads, in the present case, the head having the first azimuth. As the location shown includes the sub-code signal recording portion, it is possible to read the information in the sub-code signal recording portion, also in the +24 times nominal reproduction mode.

Figure 7:
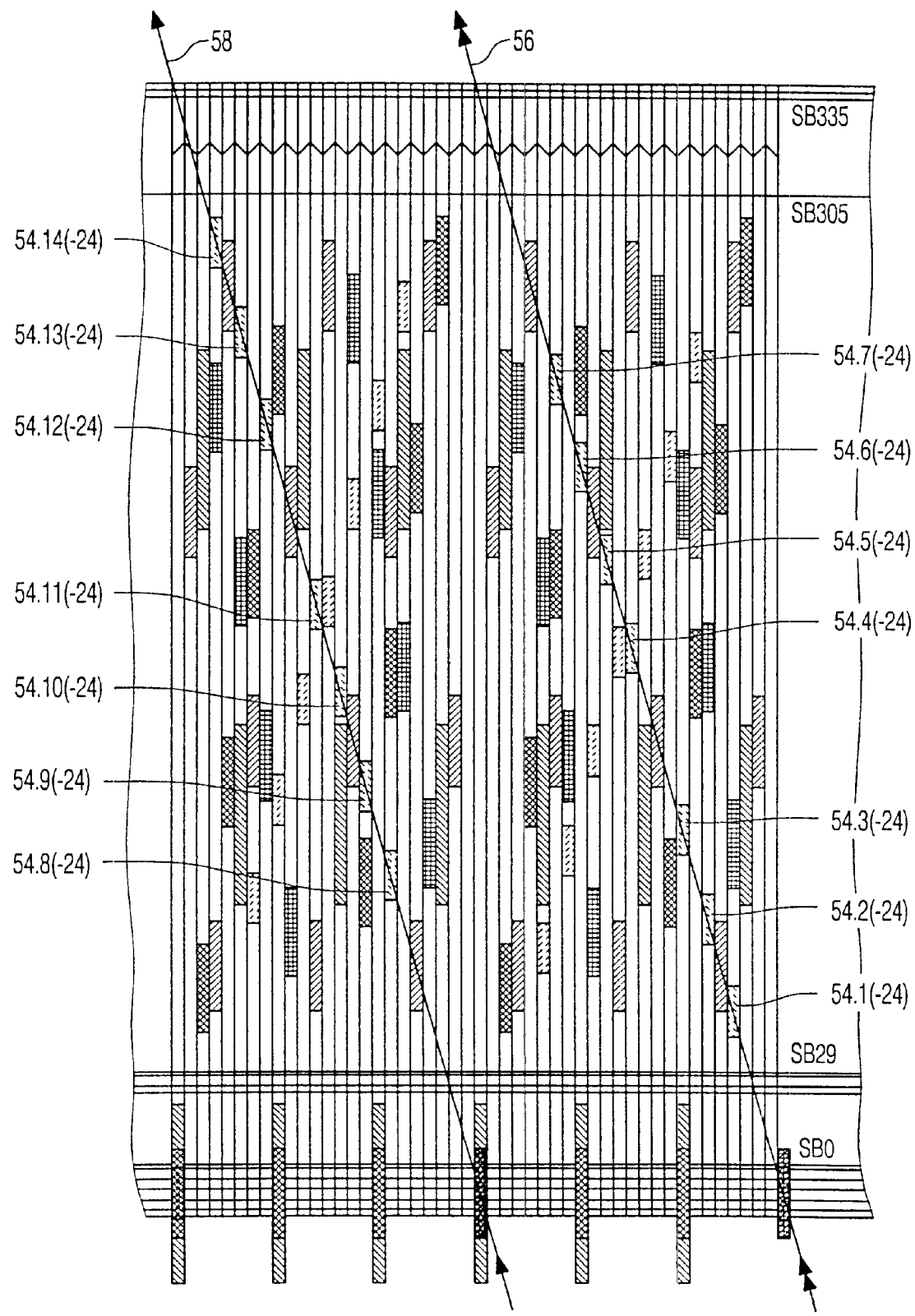
FIG. 7 shows the same format as FIG. 1, with the paths across the record carrier that the two reproduction heads follow during a sixth trick play reproduction mode, where the record carrier speed is −24 times nominal.

FIG. 7 shows a seventh information signal being recorded in specific segments in the tracks. This information signal will be called the sixth trick play signal from now on. The segments are indicated in FIG. 7 by reference numerals 54.i(−24), where i runs from 1 to 14. This sixth trick play signal is meant for a reproduction in a reproduction apparatus at a reproduction speed which is −24 times the nominal reproduction speed (that is: in the backwards direction). This sixth trick play signal could be an information signal which has no relationship whatsoever with the signals introduced earlier. Alternatively, the sixth trick play signal could have a relationship with the first information signal, in the sense that the sixth trick play signal is a trick play signal for the −24 times nominal reproduction speed, in order to obtain a reproduced (video) signal, which is a replica of the reproduced first (video) signal, but reproduced at −24 times the nominal speed (that is: in the backwards direction).

Figure 7A:
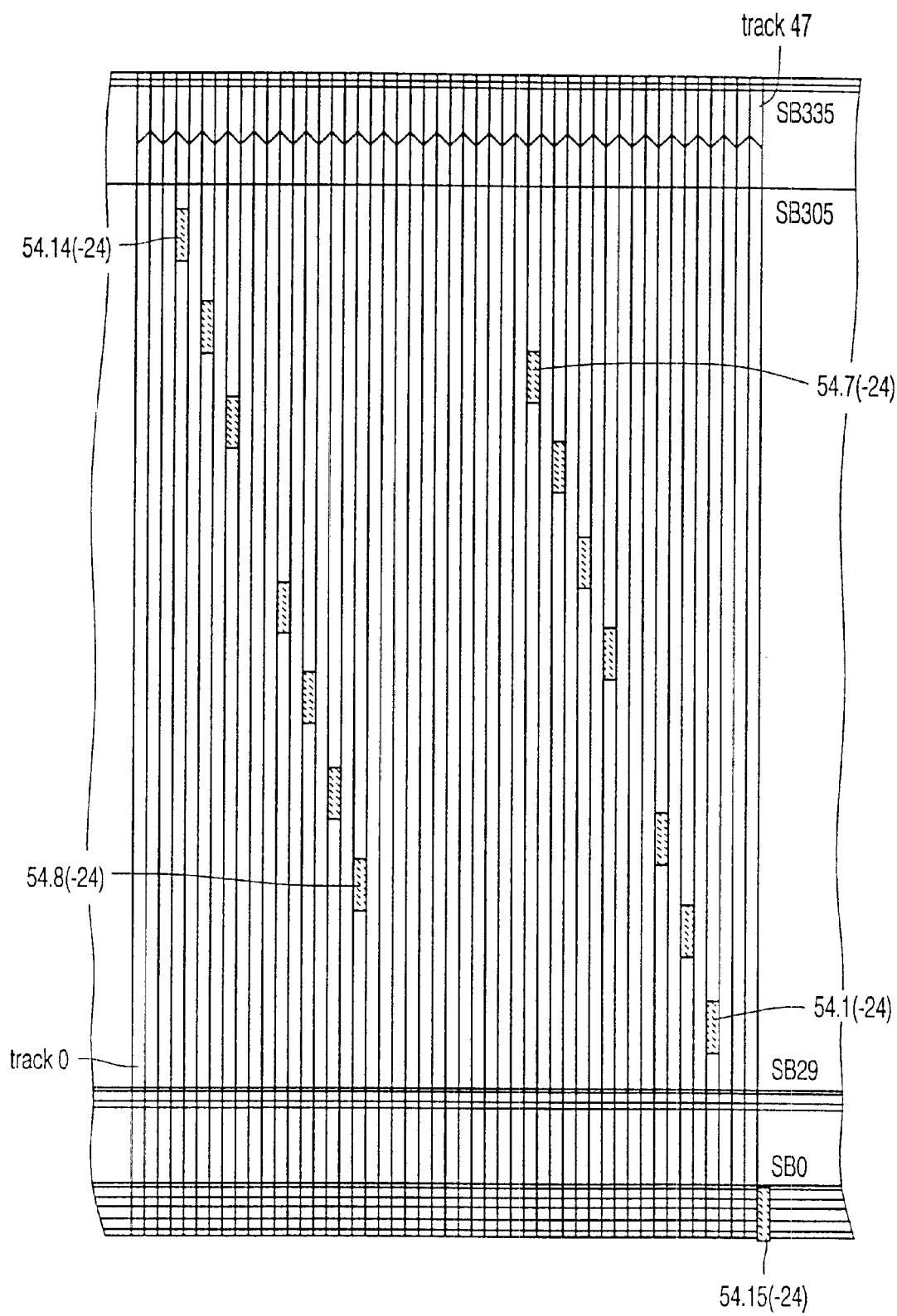
FIG. 7a shows the trick play segments for the −24 times nominal reproduction mode only, in the group of 48 tracks.

FIG. 7a shows the same group of 48 tracks as FIG. 7, however, only the 14 segments 54.i(−24) are shown in FIG. 7a. Assuming the track number of the first track in the group of 48 tracks to be track no. 0 and the track number of the last track in the group to be track number 47, the segments are recorded in the tracks with track number 3, 5, 7, 11, 13, 15, 17, 30, 32, 34, 36, 40, 42 and 44.

FIG. 7 further shows two scanning lines 56 and 58. The double-arrowed scanning line 56 shows the path that the one head, having the first azimuth angle, follow across the record carrier in the −24 times nominal reproduction mode, during one revolution of the head drum. The single-arrowed scanning line 58 shows the path that the other head, having the second azimuth angle, follow across the record carrier in the −24 times nominal reproduction mode during said one revolution of the head drum. As can be seen in FIG. 7, the one head reads the trick play segments 54.i(−24), where i equals 1 to 7, inclusive, and the other head thus reads the trick play segments 54.j(−24), where j equals 8 to 14, inclusive.

The trick play segments 54.i(−24) each have a length of 16 main sync blocks, in the present example. In the group of 14 trick play segments, four of them each comprise 8 trick play sync blocks of information of the fifth trick play signal and repetitions of those 8 sync blocks. The remaining 10 trick play sync blocks in the group comprise 7 trick play sync blocks of information of the fifth trick play signal, 1 parity sync block and one repetition of both the 7 trick play sync blocks and the parity sync block.

The trick play segments for the −24 times nominal reproduction speed can be realized as explained in the following example. When, again, numbering the main sync blocks, starting from 0, which is the first sync block in the aux recording area 8 in a track, until 305, which is the last sync block in the area 12a in the track, the sync blocks in the segment 54.1(−24) are the sync blocks in a track numbered 40 to 55, inclusive, where the sync blocks numbered 48 to 55, inclusive, are repetitions of the sync blocks 40 to 47, inclusive. No parity sync blocks are present in the segment. The sync blocks in the segment 54.2(−24) are the sync blocks in a track numbered 68 to 83, inclusive, where the sync blocks numbered 76 to 83, inclusive, are repetitions of the sync blocks numbered 68 to 75, inclusive. The sync blocks numbered 75 and 83 are the parity sync blocks. The sync blocks in the segment 54.3(−24) are the sync blocks in a track numbered 97 to 112, inclusive, where the sync blocks numbered 105 to 112, inclusive, are repetitions of the sync blocks 97 to 104, inclusive. The sync blocks numbered 104 and 112 are the parity sync blocks in the segment. The sync blocks in the segment 54.4(−24) are the sync blocks in a track numbered 154 to 169, inclusive, where the sync blocks numbered 162 to 169, inclusive, are repetitions of the sync blocks numbered 154 to 161, inclusive. The sync blocks numbered 161 and 169 are the parity sync blocks in the segment. The sync blocks in the segment 54.5(−24) are the sync blocks in a track numbered 182 to 197, inclusive, where the sync blocks numbered 190 to 197, inclusive, are repetitions of the sync blocks 182 to 189, inclusive. The sync blocks numbered 189 and 197 are the parity sync blocks in the segment. The sync blocks in the segment 54.6(−24) are the sync blocks in a track numbered 211 to 226, inclusive, where the sync blocks numbered 219 to 226, inclusive, are repetitions of the sync blocks numbered 211 to 218, inclusive. The sync blocks numbered 218 and 226 are the parity sync blocks in the segment. Further, the sync blocks in the segment 54.7(−24) are the sync blocks in a track numbered 239 to 254, inclusive, where the sync blocks numbered 247 to 254, inclusive, are repetitions of the sync blocks 239 to 246, inclusive. No parity sync blocks are present in the segment. The sync blocks in the segment 54.8(−24) are the sync blocks in a track numbered 83 to 98, inclusive, where the sync blocks numbered 91 to 98, inclusive, are repetitions of the sync blocks numbered 83 to 90, inclusive. No parity sync blocks are present in the segment.

The sync blocks in the segment 54.9(−24) are the sync blocks in a track numbered 111 to 126, inclusive, where the sync blocks numbered 119 to 126, inclusive, are repetitions of the sync blocks numbered 111 to 118, inclusive. The sync blocks numbered 118 and 126 are the parity sync blocks in the segment. The sync blocks in the segment 54.10(−24) are the sync blocks in a track numbered 140 to 155, inclusive, where the sync blocks numbered 148 to 155, inclusive, are repetitions of the sync blocks numbered 140 to 147, inclusive. The sync blocks numbered 147 and 155 are the parity sync blocks in the segment. The sync blocks in the segment 54.11(−24) are the sync blocks in a track numbered 168 to 183, inclusive, where the sync blocks numbered 176 to 183, inclusive, are repetitions of the sync blocks numbered 168 to 175, inclusive. The sync blocks numbered 175 and 183 are the parity sync blocks in the segment. The sync blocks in the segment 54.12(−24) are the sync blocks in a track numbered 225 to 240, inclusive, where the sync blocks numbered 233 to 240, inclusive, are repetitions of the sync blocks numbered 225 to 232, inclusive. The sync blocks numbered 232 and 240 are the parity sync blocks in the segment. The sync blocks in the segment 54.13(−24) are the sync blocks in a track numbered 254 to 269, inclusive, where the sync blocks numbered 262 to 269, inclusive, are repetitions of the sync blocks numbered 254 to 261, inclusive. The sync blocks numbered 261 and 269 are the parity sync blocks in the segment. The sync blocks in the segment 54.14(−24) are the sync blocks in a track numbered 282 to 297, inclusive, where the sync blocks numbered 290 to 297, inclusive, are repetitions of the sync blocks numbered 282 to 289, inclusive. No parity sync blocks are present in the segment.

Thus, during each revolution of the head drum, during a −24 times nominal reproduction mode, 224 sync blocks (14×16 sync blocks) of information of the sixth trick play signal are read from the record carrier, which is the same number of sync blocks as in the +24× reproduction mode.

FIG. 7a further shows a portion, numbered 54.15(−24), located at the lower edge of one of the tracks in the group of 48 tracks. This location is a location that can be read in the −24 times nominal reproduction mode by one of the two heads, in the present case, the head having the first azimuth. As the location shown includes the sub-code signal recording portion, it is possible to read the information in the sub-code signal recording portion, also in the −24 times nominal reproduction mode.

Next, the format of the sync blocks will be discussed with reference to FIG. 8. A sync block in a trick play segment has the same length as the other sync blocks in the main data area 12 of FIG. 1, in which the first digital information signal is stored. A sync block is 112 bytes long and comprise a sync word of 2 bytes long, an identification portion 60, denoted ID, a header portion 61, denoted 'main header', an aux byte 62, denoted 'data-aux' and a data area 64, which is 104 bytes long. The data area 64 has room for storage of 96 bytes of data of an information signal (one of the second to seventh information signals) and 8 parity bytes.

Figure 8:
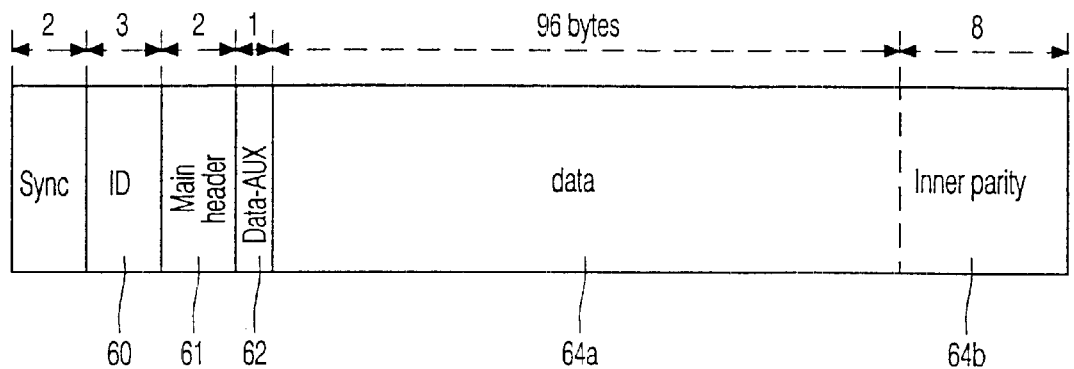
FIG. 8 shows the format of a sync block.
Figure 9:
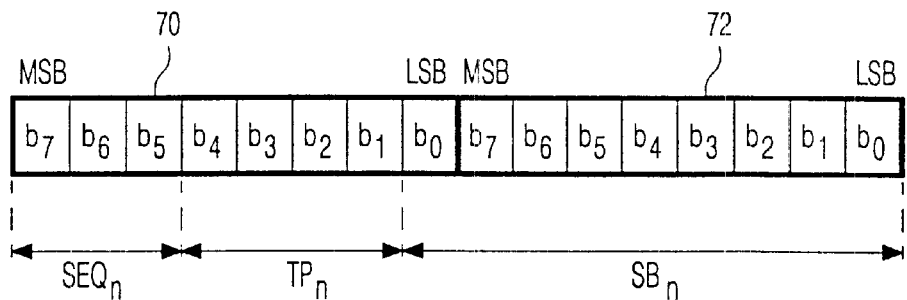
FIG. 9 shows the format of the ID portion in the sync block of FIG. 8.

FIG. 9 shows the first two bytes 70 and 72 of the identification portion 60 of FIG. 8. The last byte in the identification portion 60 is a parity byte, obtained from the two bytes 70 and 72. The bits b4 to b7 of the byte 70 form a 4-bit sequence number $SEQ_n$. The bits b1 to b3 of the byte 70 form a 3-bit track pair number $TP_n$. The bit b0 and the eight bits of the byte 72 form a 9-bit sync block number $SB_n$. The most left bits in FIG. 9 of the three numbers defined above is the most significant bit. The sequence number $SEQ_n$ runs (expressed in decimal values) from 0 to 15 and indicates subsequent groups of 6 subsequent tracks (or: 3 subsequent track pairs, each track pair formed by two subsequent tracks with the first and the second azimuth). The information in such groups of 6 tracks form a unit, in the sense that an ECC block of information is stored in a group of 6 subsequent tracks. The track pair number runs (expressed in decimal values) from 0 to 2, to indicate the three track pairs in a group of 6 tracks that form an ECC block. The sync block number $SB_n$ counts up for every sync block from 000000000 to 101001111 (0 to 335 decimal). The sync block number 000000000 is assigned to the first sync block in the aux area 8, see FIG. 2. In the absence of an aux area, the first sync block in the main area 12, which then extends to the preamble 7 in FIG. 2, will be given the sync block number 000000000. This corresponds exactly to the sync block numbers 0 to 335 given in FIG. 1.

Figure 10:
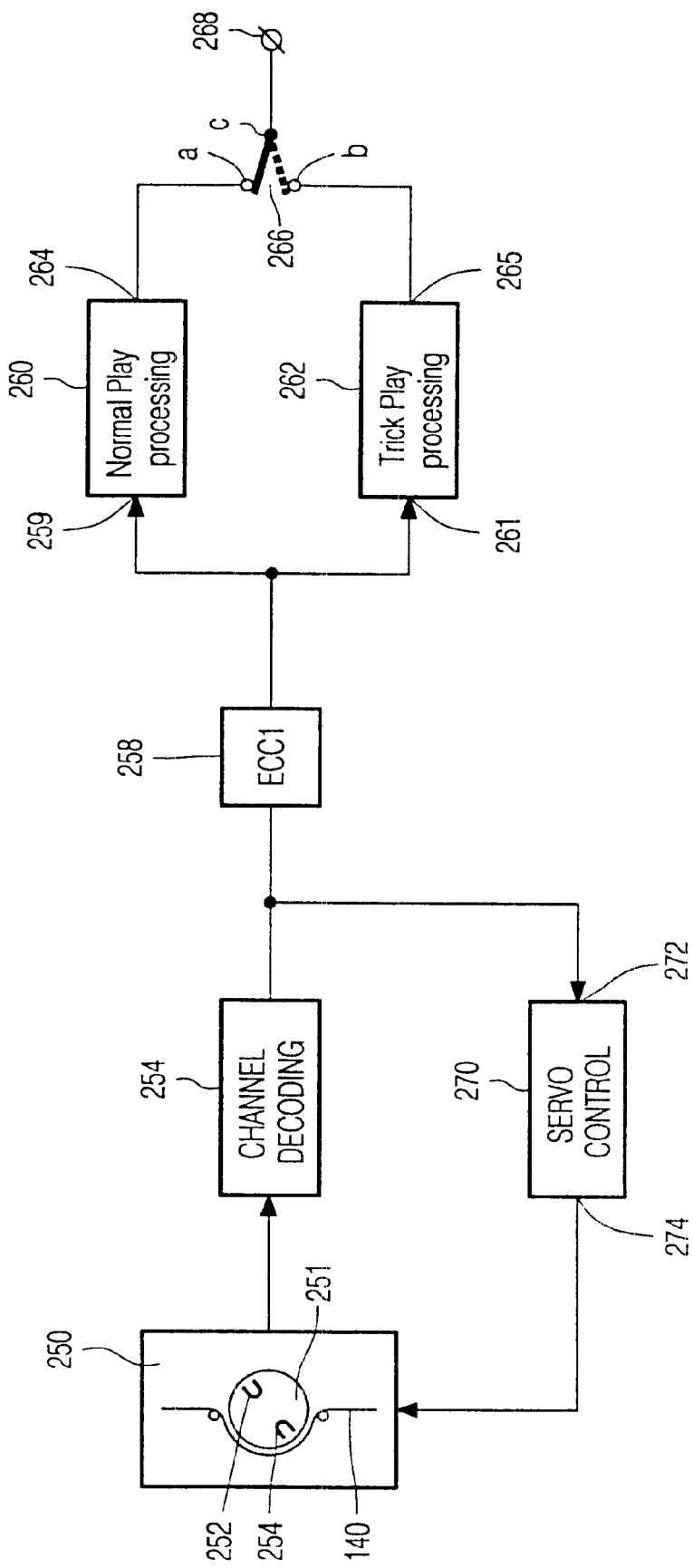
FIG. 10 shows an embodiment of a reproduction apparatus.

FIG. 10 shows, schematically, an embodiment of a reproduction apparatus for reproducing information from the record carrier 140. The reproduction apparatus comprises a reading unit 250, having at least two reading heads 252 and 254, for reading information from the slant tracks on the record carrier 140. The one read head has a gap with an azimuth angle which equals the first azimuth angle, see the azimuth angle from bottom left to top right in the circle 20 of FIG. 1, and the other read head has a gap with an azimuth angle which equals the second azimuth angle, see the azimuth angle from bottom right to top left in the circle 20 of FIG. 1. An output of the reading unit 250 is coupled to an input of a channel decoding unit 256. The channel decoding unit may be adapted to carry out a 25-to-24 decoding on the signal read out, so as to convert 25-bit words in the incoming datastream into 24-bit words, such as disclosed in document D4. Next, an error correction is carried out in the error correction unit 258.

The error correction unit 258 is used for carrying out an (inner) error correction step on the information read from the record carrier in the 'normal play' as well as in a 'trick play' reproduction mode, on the basis of the inner parity information stored in the portions 64b of the sync blocks, see FIG. 8.

The output of the error correction unit 258 is coupled to an input 259 of a 'normal play' processing unit 260. Further, a 'trick play' processing unit 262 is provided having an input 261 also coupled to the output of the error correction unit 258. Outputs 264 and 265 of the 'normal play' processing unit 260 and the 'trick play' processing unit 262, respectively, are coupled to corresponding terminals a and b, respectively, of a switch 266, a c-terminal of which is coupled to an output terminal 268.

The processing unit 260 comprises a circuit part capable of carrying out an outer error correction step on the information supplied by the error correction unit 258 in the normal play reproduction mode, using the outer parity information comprised in the track portion 12b, see FIG. 2. The processing unit 262 comprises a circuit part capable of carrying out an error correction step on the information supplied by the error correction unit 258 in the trick play reproduction mode, using the trick play sync blocks comprising parity information, as well as the repetitions of the sync blocks in the trick play segments. The error correction step in the processing units 260 and 262 using the parity information is the same for both modes: the normal play reproduction mode as well as a trick play reproduction mode. Therefore, the processing units 260 and 262 can share the error correction circuit for carrying out this error correction step.

If the reproducing apparatus is switched into a 'normal play' reproduction mode, this means that the record carrier 140 is transported at a nominal speed, that the 'normal play' processing unit 260 is enabled and the switch 266 is switched into the position a-c. If the reproducing apparatus is switched into a 'trick play' reproduction mode, also called 'feature mode', this means that the record carrier 140 is transported at a speed other than the nominal speed, that the 'trick play' processing unit 262 is enabled and the switch 266 is switched into the position b-c.

For enabling a 'trick play' reproduction mode, the reproducing apparatus is further provided with a tape tracking servo control means 270 which generates a control signal for controlling the speed of the record carrier 140. More specifically, the control means 270 generates a control signal during the 'trick play' reproduction mode for transporting the record carrier 140 such that, in the first trick play mode with the record carrier speed being +4 times the nominal reproduction speed, in accordance with FIG. 1, the head 252 crosses the tracks in accordance with the line 24 and the head 254 crosses the tracks in accordance with the line 26 in FIG. 1.

In the second trick play reproduction mode, with the record carrier speed being −4 times the nominal reproduction speed, the control means 270 generates a control signal such that, in accordance with FIG. 3, the head 252 crosses the tracks in accordance with the line 30 and the head 254 crosses the tracks in accordance with the line 32 in FIG. 3.

In the third trick play reproduction mode, with the record carrier speed being +12 times the nominal reproduction speed, the control means 270 generates a control signal such that, in accordance with FIG. 4, the head 252 crosses the tracks in accordance with the line 36 and the head 254 crosses the tracks in accordance with the lines 37 in FIG. 4.

In the fourth trick play reproduction mode, with the record carrier speed being −12 times the nominal reproduction speed, the control means 270 generates a control signal such that, in accordance with FIG. 5, the head 252 crosses the tracks in accordance with the line 42 and the head 254 crosses the tracks in accordance with the line 44 in FIG. 5.

In the fifth trick play reproduction mode, with the record carrier speed being +24 times the nominal reproduction speed, the control means 270 generates a control signal such that, in accordance with FIG. 6, the head 252 crosses the tracks in accordance with the line 50 and the head 254 crosses the tracks in accordance with the line 51 in FIG. 6.

In the sixth trick play reproduction mode, with the record carrier speed being −24 times the nominal reproduction speed, the control means 270 generates a control signal such that, in accordance with FIG. 7, the head 252 crosses the tracks in accordance with the line 56 and the head 254 crosses the tracks in accordance with the line 58 in FIG. 7.

The record carrier transport control realized in the way explained above is named: track select transport control, in the sense that specific paths across the record carrier are selected for reproduction in a trick play reproduction mode, said paths beginning at specific tracks on the record carrier. Further, those paths are chosen such that at least one of the two read heads is capable of reading the sub-code information recorded in the recording portions 4 of the tracks. In FIG. 1, this is the head following the path 24. The head following the path 26 is not capable of reading the sub-code recording portions 4, as it scans the sub-code recording portions of tracks having the wrong azimuth. In FIG. 3, this is the head following the path 30. The head following the path 32 is not capable of reading the sub-code recording portions 4, as it scans the sub-code recording portions of tracks having the wrong azimuth. In FIG. 4, this is the head following the path 36. The head following the path 37 is not capable of reading the sub-code recording portions 4, as it scans the sub-code recording portions of tracks having the wrong azimuth. In FIG. 5, this is the head following the path 42. The head following the path 44 is not capable of reading the sub-code recording portions 4, as it scans the sub-code recording portions of tracks having the wrong azimuth. In FIG. 6, this is the head following the path 50. The head following the path 51 is not capable of reading the sub-code recording portions 4, as it scans the sub-code recording portions of tracks having the wrong azimuth. In FIG. 7, this is the head following the path 56. The head following the path 58 is not capable of reading the sub-code recording portions 4, as it scans the sub-code recording portions of tracks having the wrong azimuth.

The tracking control that will be further described hereafter, is based on deriving the identification information ID from the third and fourth byte in a sync block, see FIG. 8. This information can be derived from the information stream at the output of the channel decoder unit 254, this for the reason that the ID information is protected from errors by its own parity byte, which is the fifth byte in the sync block. One could, as an alternative, derive the ID information from the output of the ECC1 unit 258. When the ECC1 and the ID information are related, this has the advantage that, if the ID information appears to be incorrect, the ECC1 unit generates an error flag, so that it can be decided not to use the ID information of the sync block just read for generating the tracking control signal. On the other hand, in this alternative, the ECC1 unit 258 generates an additional processing delay in the tracking control loop. Further, too many bit errors may also lead to an error flag, resulting in a possible rejection of correct ID information.

Figure 11:
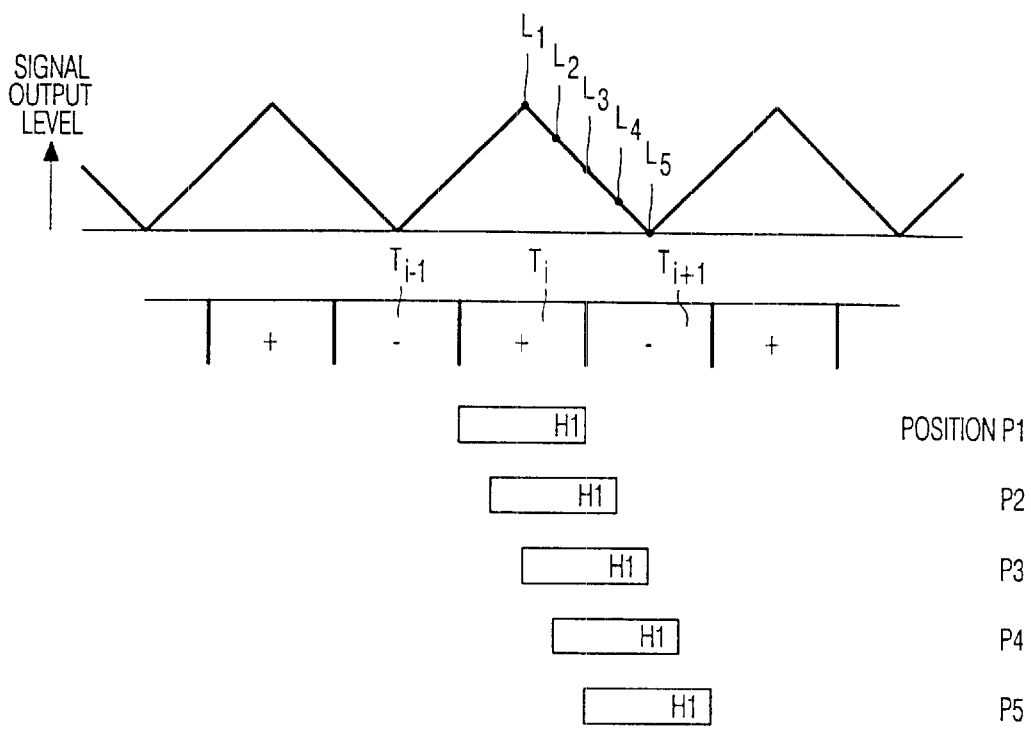
FIG. 11 shows the position of a head with reference to the transverse direction of the tracks and the signal level of the signal read by the head.

The reproduction in a trick play reproduction mode will now be explained in more detail. During trick play reproduction, tracking control is carried out so as to scan the trick play segments as correctly as possible, as well as the sub-code portion stored in the most left track in FIG. 1. FIG. 11 shows the signal level of the signal read from the record carrier when scanning the tracks in a trick play reproduction mode. FIG. 11 shows the position of one of the heads $H_1$ having a positive azimuth angle, that is: one of the two azimuth angles shown in FIG. 1, in a direction transverse to the longitudinal direction of the tracks. In a position $P_1$, when the head $H_1$ is positioned on the track $T_i$, the level of the signal read from the record carrier is $L_1$. When moving the head to the right in FIG. 11, towards position $P_2$, which is a position where the head is partly positioned on the track $T_i$ and partly on the track $T_{i+1}$, which has the incorrect azimuth, the level decreases towards $L_2$. Further moving the head towards the right in FIG. 11 leads to a further decrease of the signal level, which is for the positions $P_3$, $P_4$ and $P_5$ (when the head is fully positioned on the wrong track, equal to $L_3$, $L_4$ and $L_5$, respectively.

Figure 12:
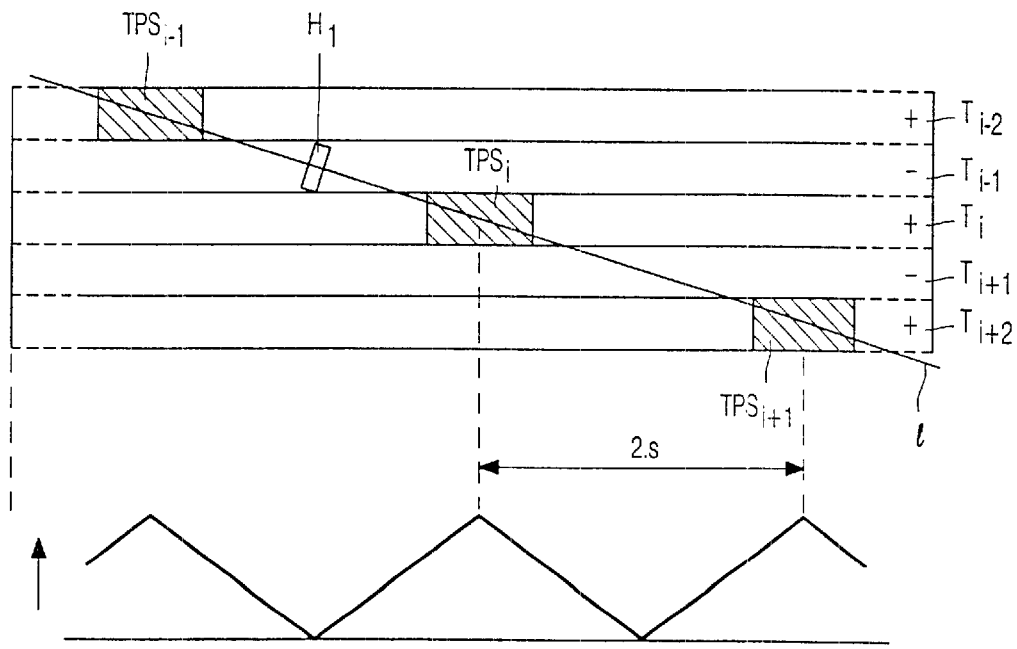
FIG. 12 shows the reference trace across the record carrier and the signal level of the signal read by the head during this scanning trace.

FIG. 12 shows the same behavior, where the output level of the signal read by the head $H_1$ is shown as a function of the position of the head in the longitudinal position of the track. Only when the signal level of the signal read by the head is sufficiently large, can the signal be used for reproduction. The trick play segments should thus lie at and around the position where the signal level is maximum. FIG. 12 show examples of three of such trick play segments, indicated by the hatched portions $TSP_{i-1}$, $TPS_i$ and $TSP_{i+1}$ in the tracks $T_{i-2}$, $T_i$ and $T_{i+2}$, respectively. Tracking is now carried out, by controlling the transport speed of the record carrier as well as carrying out a track select 'phase control', and thereby controlling the scanning trace 1 across the record carrier, such that the maximum signal output level is read out at the moments that the head is located above the middle of a trick play segment, belonging to the trick play speed selected.

From the previous description of the track format, the ideal positions in the tracks of the trick play segments for a trick play speed are known. It is thus also known which trick play sync blocks are read during one rotation of the head drum, and at what time instant during the said rotation of the head drum. So, by detecting the real position of a sync block with an expected position of the sync block, it is possible to control the record carrier speed in order to control the distance between those two positions to zero. More specifically, the tracking control controls the record carrier speed and phase such that the maximum signal output level is obtained when the head is located more or less exactly in the middle of a trick play segment.

The derivation of an error signal for controlling the read out of data from the trick play segments in a trick play reproduction mode will now be further explained with reference to specific example of a reproduction in a +12× trick play reproduction mode, as shown in FIGS. 13*a*–13*d*.

Figures 13A, 13B, 13C, 13D:
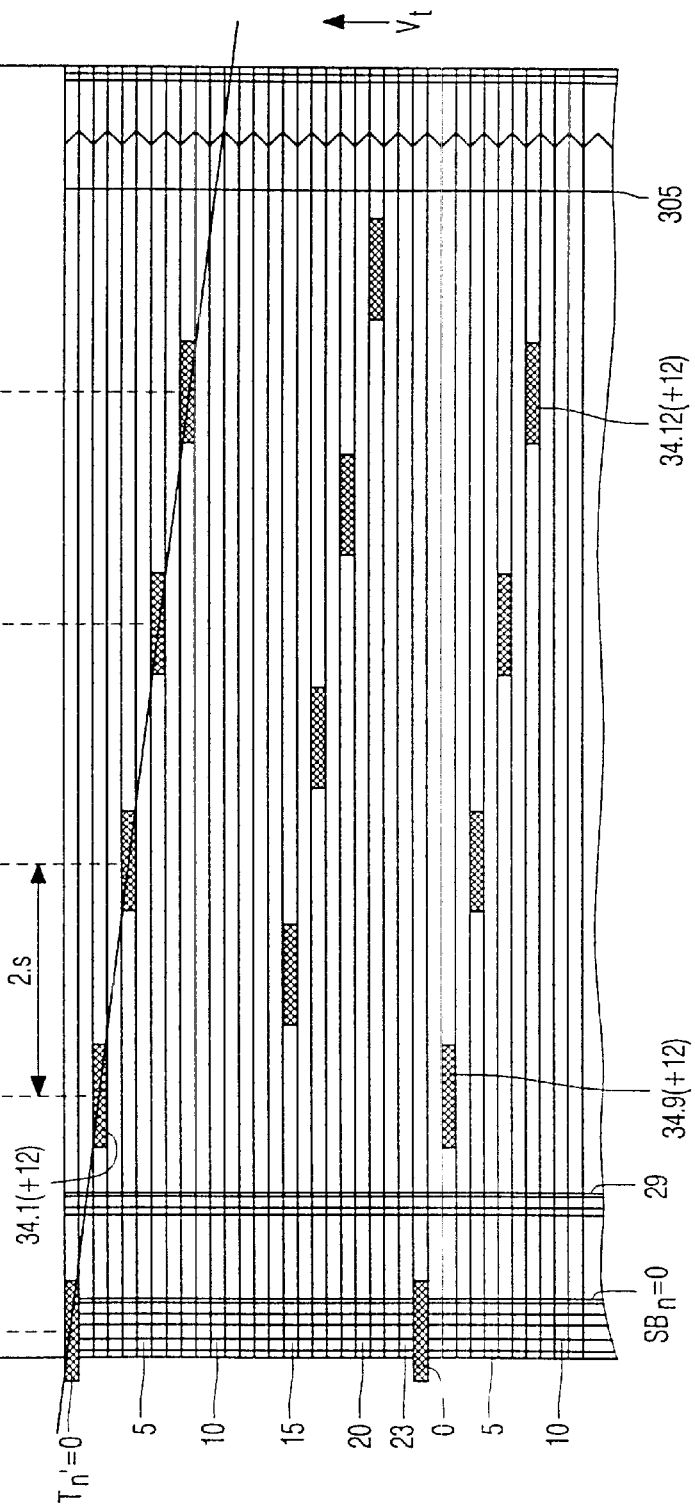
FIGS. 13a–13d show the error signal obtained when reproducing information with the first head during a +12× trick play reproduction mode.

FIGS. 13a–13d show, in FIG. 13d, the track pattern with the trick play segments for the +12× trick play reproduction mode. Only that portion of the record carrier, with the trick play segments 34.1(+12) to 34.12(+12), are shown, as well as the sub-code area 34.17(+12) read in this reproduction mode. FIG. 13a shows the signal level of the signal read from the first head during the first half of the revolution of the head drum, in which the trick play segments 34.1(+12) to 34.4(+12), as well as the sub-code portion 34.17(+12) are read, assuming the head follows the ideal scanning trace across the record carrier. From FIG. 13a, it is clear that the maxima lie substantially half-way the sub-code area portion (maximum $m_1$) and half way the trick play segments. When using the sync block numbers of the example given above with reference to FIG. 4a, those maxima lie exactly at the boundaries the sync blocks numbered 54 and 55 (maximum $m_2$), 119 and 120 (maximum $m_3$), 184 and 185 (maximum $m_4$), 249 and 250 (maximum $m_5$). Further, a maximum (maximum $m_6$) is present between the sync blocks numbered 314 and 315, which is a position lying in the parity area 12b.

Figure 12A:
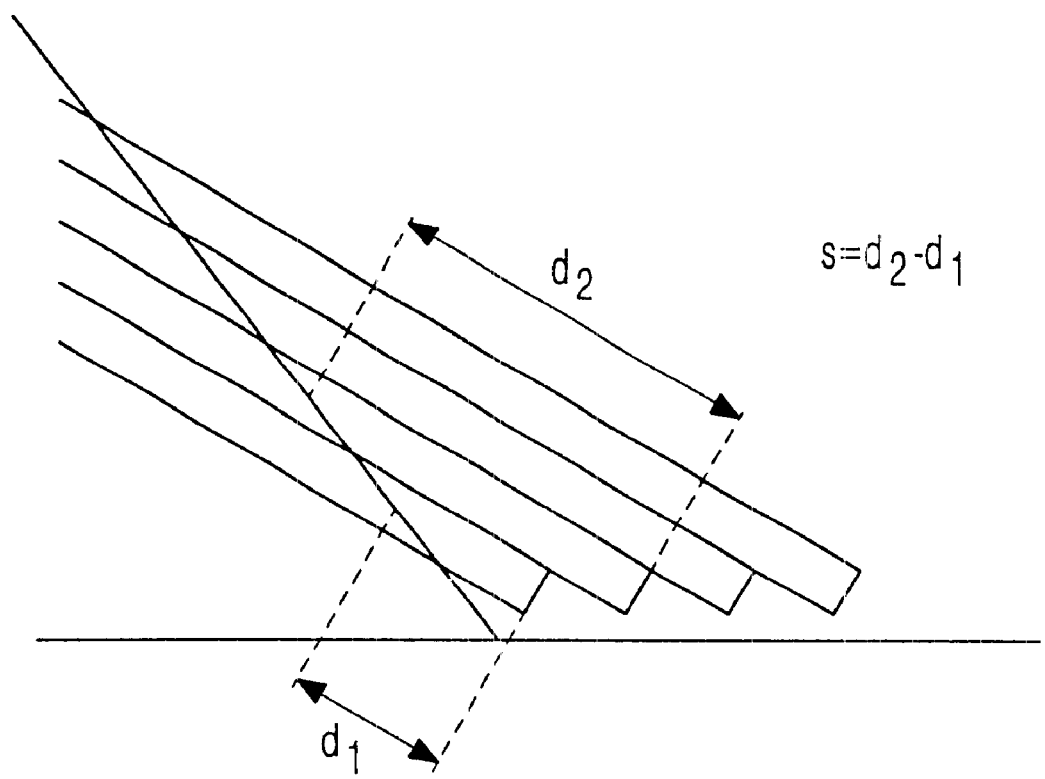
FIG. 12a shows a definition of the constant s.

It is assumed that a tracking error signal is derived using the following formula:

$$E = T_n' - (SB_n + C_3)/s, \quad \text{(Eq. 1)}$$

where $T_n'$ is the 'trick play track number' of the track in which a sync block read from the record carrier is located, and $SB_n$ is the sync block number of the sync block read from the record carrier. The trick play track numbers are shown to the left of the track pattern in FIG. 13d. Preferably, $T_n' = T_n$ mod $(2*n)$, where $T_n$ is a track number that can run through larger cycles than between 0 to 2n−1, and could be identified as the track numbers for normal play. In a definition given later, $T_n$ will run from 0 to 95, where in the present trick play mode, for n=12, $T_n'$ runs from 0 to 23. For the other trick play speeds of 4× and 24× the nominal record carrier speed in either the forward and backwards direction, the trick play track numbers thus run from 0 to 7, inclusive, and 0 to 47, inclusive, respectively. As can easily be seen, the cycle of track numbers for the normal play situation (which is 96 tracks long) is thus a multiple of a cycle of trick play track numbers for a trick play situation. s is a constant for each trick play speed, but s differs for different trick play speeds The definition of s is explained with reference to the FIGS. 12 and 12a. FIG. 12a shows distances $d_1$ and $d_2$, defined as the distance between a reference point for all the tracks, which could be the start position of the tracks, and the location in two subsequent tracks, where the head when scanning the tracks, is located precisely above the tracks. s is defined as the difference $d_2 - d_1$. This means that in FIG. 12, the distance between two subsequent maxima is 2*s. The term $C_3$ accounts for the fact that the maximum $m_1$ lies a certain distance from the sync block in the aux area 8 having the sync block number 0, which sync block is the first sync block in the aux area 8. For the further explanation of the invention, it will be assumed that $C_3$ equals 9, for the reason that the maximum $m_1$ lies nine sync blocks to the left of the start position of the sync block in the aux area having the sync block number 0. Actually, however, $C_3$ will be chosen equal to 9.5, as the maximum lies 9.5 sync blocks to the left of the middle position of the sync block numbered 0.

Using Eq. 1, the error signal at the location of the maximum $m_2$ equals 0, as:

$$E = 2 - (2*s - 9 + 9)/s = 2 - 2*s/s = 0.$$

The error signal at the location of the maximum $m_3$ equals 0 as well, as:

$$E = 4 - 2*(2*s - 9 + 9)/s = 0.$$

It will be clear that for all the maxima, the error signal E will be zero.

For locations to the left of the maxima, Eq. 1 gives a positive error value, the error value increasing for positions further away from the maxima. For locations to the right of the maxima, Eq. 1 gives a negative error value, the absolute error value increasing for positions further away from the maxima. FIG. 13b shows the error signal, derived from the sync blocks using the equation given above, for the first half revolution of the head drum.

The error signal is only present in the regions around the maxima in the read out signal, and thus absent outside those regions. This for the reason that only for sufficiently large output levels in the read out signal an accurate detection of the information in the sync blocks can be realized. It should further be noted that, in an ideal situation, an error signal portion in the region around a maximum is 'symmetric' around this maximum, in the sense that the error signal in the error signal portion is a straight line through the position along the track where the maximum occurs. Further, the positive part of the error signal portion at the right hand side of the position of the maximum in the read out signal level is as long as the negative part of the error signal level portion at the left hand side of the position of the maximum in the read out signal level.

Suppose now that a mis-tracking over two tracks downwards in FIG. 13d takes place.

At the location of the maximum $m_2$, the error signal E now equals 2, for the reason that $T_n'$ in Eq. 1 equals 4. For the other maxima, the error signal E also equals 2. The mis-tracking in downwards direction thus leads to a shift in positive direction of the error signals shown in FIG. 13b. This results in the error signals shown in FIG. 13c. The shift in positive direction is higher for larger mis-trackings in the downwards direction. Positive error signals thus must lead to a control of the record carrier speed so as to slow down the speed until the optimal trace has been reached.

But, using Eq. 1 for deriving the error signal, results, even in the case of a mis-tracking over more than 12 tracks in the downwards direction, in a control to bring the scanning trace back to the scanning trace shown in FIG. 13d, although it seems more practical to control the scanning trace to scan the trick play segments 34.9(+12) to 34.12(+12), by speeding up the record carrier speed a little bit. Therefore, the following equation for the error signal is more appropriate:

$$E = \{T_n' - (SB_n + C_3)/s + a\} \bmod (2*n) - a \quad \text{(Eq. 2)}$$

where a is preferably equal to n, in order to obtain a symmetrical error signal. The mod (2*n) operation in this respect is defined as an operation to add or subtract as many times the value 2*n, which equals 24, from the value on which the operation is to be carried out until the value obtained lies within the range of 0 to 24, exclusive.

Carrying out the same calculations as given above, and using the Eq. 2, results in the same error signals for the scanning trace shown in FIG. 13d, as well as the same error signals for mis-trackings up to n, exclusive, more specifically 12, tracks in the downwards direction in FIG. 13d. A mis-tracking in the downwards direction over n or more than n (=12) and less than 2n(=24) tracks, such as 22 tracks, is now the same as a mis-tracking of 2 tracks of the ideal trace in the upwards direction in FIG. 13d. This results in a shift in negative direction of the error signals shown in FIG. 13b. Such error signals now result in a speeding up of the record carrier speed, so that for mis-trackings of plus 12 tracks and minus 12 tracks at maximum from the ideal scanning trace, the tracking control controls the scanning towards the same ideal scanning trace shown in FIG. 13d. It should be noted that this ideal scanning trace could, of course, be a scanning trace ideally scanning the trick play segments 34.9(+12) to 34.12(+12).

Eq. 2, expressed in track numbers $T_n$ that run from 0 to 95, as will be made clear later, more generally, from 0 to a value larger than 2n−1, leads to the following equation:

$$E=\{T_n \bmod (2{*}n)-(SB_n+C_3)/s+a\} \bmod (2{*}n)-a \qquad \text{(Eq. 3)}$$

Twice carrying out the mod (2*n) operation on $T_n$, doesn't make very sense, so that Eq. 3 can be simplified into:

$$E=\{T_n-(SB_n+C_3)/s+a\} \bmod (2{*}n)-a \qquad \text{(Eq. 4)}$$

which shows a large resemblance with Eq. 2, and can thus be used irrespective of whether having trick play track numbers or track numbers.

Now, the scanning of the second head will be discussed. The second head should scan the trick play segments 34.5(+12) to 34.8(+12) and 34.13(+12) to 34.16(+12).

FIG. 14a shows the signal level of the signal read from the second head during the second half of the revolution of the head drum, in which the trick play segments 38.5(+12) to 38.8(+12) are read, assuming the head follows the ideal scanning trace across the record carrier, as shown in FIG. 14d. From FIG. 14a, it is also clear that the maxima lie exactly half way the trick play segments. When, again, using the sync block numbers of the example given above, those maxima lie at the boundaries between the sync blocks numbered 87 and 88 (maximum $m_8$), 152 and 153 (maximum $m_9$), 217 and 218 (maximum $m_{10}$) and 282 and 283 (maximum $m_{11}$). Further, a maximum (maximum $m_7$) exists at the boundary between the sync blocks numbered 22 and 23, which is outside the main area 12a.

The Eqs. 2, 3 and 4 should be modified so as to generate an error signal such that, in the ideal situation, the error signal is zero at the position in the track corresponding with a maximum in the signal level of the read out signal. The following equations satisfy this requirement:

$$E=\{T_n'b-(SB_n+C_3)/s+a\} \bmod (2{*}n)-a \qquad \text{(Eq. 5)}$$

$$E=\{T_n' \bmod (2{*}n)-b-(SB_n+C_3)/s+a\} \bmod (2{*}n)-a \qquad \text{(Eq. 6)}$$

$$E=\{T_n-b-(SB_n+C_3)/s+a\} \bmod (2{*}n)-a \qquad \text{(Eq. 7)}$$

The parameter b has a relation with the scanner configuration and equals n for the scanner shown in FIG. 10. The parameter b will be further discussed later.

For the trick play segment 34.5(+12) on the ideal scanning trace shown in FIG. 14d, the extra term b in the various equations equals 12, so that at the location of the maximum $m_8$ (and thus also at the location of the other maxima), the error signal E equals 0. A further study of the equations shows that for increasing distances at the left hand side of a maximum, the error signal E is increasingly positive and for increasing distances at the right hand side of a maximum, the error signal E is increasingly negative. This results in the error signals shown in FIG. 14b. Further, a mis-tracking in downwards direction in FIG. 14d leads to a shift of the error signals into the positive direction, resulting in the error signals shown in FIG. 14c. In response to the error signals shown in FIG. 14c, the tracking control realizes a slowing down of the speed so as to bring the actual scanning trace of the second head back towards the ideal scanning trace shown in FIG. 14d. A mis-tracking in upwards direction in FIG. 14d leads to a shift of the error signals into the negative direction. In response to such error signals, the tracking control realizes a speeding up of the speed so as to bring the actual scanning trace of the second head back towards the ideal scanning trace shown in FIG. 14d.

In the foregoing, it has been assumed that the sub-code area 34.17(+12) lies on the track with track number 0. When the sub-code area does not lie on a track with track number 0, the above equations should be modified by replacing $T_n$ (or $T_n'$) in the above equations by $T_n-C_0$ ($T_n'-C_0$), where $C_0$ is the track number of the track comprising the sub-code area 34.17(+12).

The equations for each of the two heads can now be combined into general equations, which are actually the Eqs. 5, 6 and 7. These equations can be used for deriving the error signal during scanning of the trick play segments by both heads, namely, by making b equal to zero for the first head and making b equal to n for the second head.

For other scanner configurations, the behavior of b is as follows. For a scanner configuration with one head pair, with two heads positioned next to each other, on the head drum, b=0 for the one head and b=1 for the other head, for the reason that both heads scan neighboring tracks. For a scanner configuration with four heads positioned on the head drum, b=0 for the first head, b=$b_1$ for the second head, b=$b_2$ for the third head and b=$b_3$ for the fourth head. In the case of four heads positioned at angles of 90° around the circumference of the head drum, $b_1$=n, $b_2$=2n and $b_3$=3n. For two head pairs located at 180° around the circumference of the head drum, $b_1$=1, $b_2$=2n and $b_3$=2n+1, when the four heads each have different azimuth angles. When having only two azimuth angles, $b_1$=$b_3$=1 and $b_2$=0.

Next, the tracking for a trick play reproduction mode in the reverse direction will be explained. It should be noted in this respect that, for trick play speeds in the reverse direction, n is defined as a negative number.

The derivation of an error signal for controlling the read out of data from the trick play segments in a −12× trick play reproduction mode will now be further explained with reference to FIGS. 15a–15d. FIGS. 15a–15d show, in FIG. 15a, the track pattern with the trick play segments for the −12× trick play reproduction mode. FIG. 15b shows the signal level of the signal read from the record carrier by the first head during the first half of the revolution of the head drum, in which the trick play segments 40.1(−12) to 40.4 (−12), as well as the sub-code portion 40.17(−12) are read, assuming the head follows the ideal scanning trace across the record carrier. From FIG. 15b, it is clear that the maxima lie exactly half-way the sub-code area portion (maximum $m_1$) and half-way the trick play segments.

When using the sync block numbers of the example given above with reference to FIG. 5a, those maxima lie exactly at the boundaries the sync blocks numbered 99 and 100 (maximum m3), 154 and 155 (maximum $m_4$), 209 and 210 (maximum $m_5$), 264 and 265 (maximum m6). Further, other maxima (the maxima $m_1$, $m_2$ and $m_7$) are present.

The assumption that will be made is to express $T_n'$ in trick play track numbers that run from 0 to 2*n−1, inclusive (that is, in the present example, from 0 to 23, inclusive), in the reverse direction, instead of using the original trick play track numbers, defined above, that ran in the forward direction.

With this assumption, the following formula will be used for deriving the error signal:

$$E=\{T_n'-(SB_n+C_3)/s+a\} \bmod (2{*}n)-a, \qquad \text{(Eq. 8)}$$

where a now preferably equals |n|, and where $T_n'$ is the trick play track number of the track in which a sync block read from the record carrier is located, and is defined by the equation:

$$T_n' = -T_n \bmod (2*|n|),$$

and $T_n$ has the same meaning as given above.

The trick play track numbers are shown to the left of the track pattern in FIG. 15a. The tracks comprising the sub-code areas 40.17(-12) and 40.18(-12) have the trick play track number 0. In between those two tracks, the trick play track numbers increase for tracks lying further upwards in FIG. 15a, as shown.

Using Eq. 8, the error signal at the location of the maximum $m_2$ equals 0, as:

$$E = \{2-(2*s-9+9)/s+12\} \bmod 24-12 = \{12\} \bmod 24-12 = 0.$$

The mod $(2*|n|)$ operation in this respect is defined as an operation to add or subtract as many times the value $2*|n|$ from the value on which the operation is carried out until the value obtained lies within the range of 0 to 24, exclusive.

The error signal at the location of the maximum $m_3$ equals 0 as well, as:

$$E = \{4-(4*s-9+9)/s+12\} \bmod 24-12 = (12) \bmod 24-12 = 0.$$

It will be clear that for all the maxima, the error signal E will be zero.

For locations to the left of the maxima, Eq. 8 gives a positive error value, the error value increasing for positions further away from the maxima. For locations to the right of the maxima, Eq. 8 gives a negative error value, the absolute error value increasing for positions further away from the maxima. FIG. 15b shows the error signal, derived from the sync blocks using the equation given above, for the first half revolution of the head drum.

Suppose now that a mis-tracking over two tracks downwards in FIG. 15a takes place.

At the location of the maximum $m_2$, the error signal E now equals -2, for the reason that $T_n'$ in Eq. 8 equals 0. For the other maxima, the error signal E also equals -2. The mis-tracking in downwards direction thus leads to a shift in negative direction of the error signals shown in FIG. 15c. This results in the error signals shown in FIG. 15d. The shift in negative direction is higher for larger mis-trackings in the downwards direction. From the discussion with reference to the +12× reproduction mode, it follows that negative error signals lead to a control of the record carrier speed so as to speed up the record carrier speed. This is correct, as such speeding up indeed brings the actual scanning trace back to its ideal scanning trace, as shown in FIG. 15a.

In an equivalent reasoning, a mis-tracking upwards in FIG. 15a, results in a shift in positive direction of the error signals shown in FIG. 15c. The shift in positive direction is higher for larger mis-trackings in the upwards direction in FIG. 15a. From the discussion with reference to the +12× reproduction mode, it also follows that positive error signals lead to a control of the record carrier speed so as to slow down the record carrier speed. This is correct, as such slowing down indeed brings the actual scanning trace back to its ideal scanning trace, as shown in FIG. 15a.

Figures 16A, 16B, 16C, 16D:
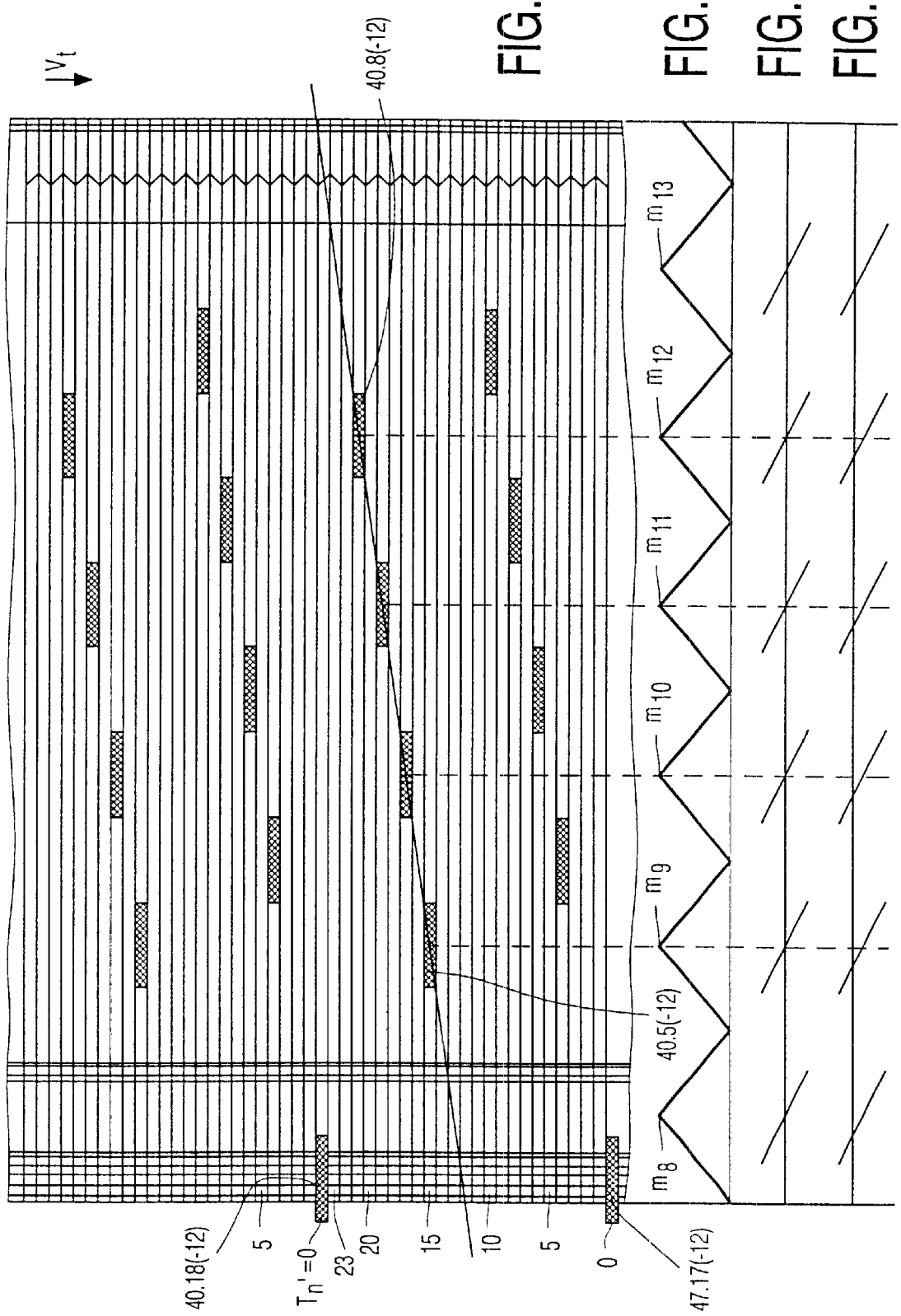
FIGS. 16a–16d show the error signals obtained, when reproducing information with the second head during a −12× trick play reproduction mode.

Now, the scanning of the trick play segments 40.9(-12) to 40.12(-12) will be described with reference to FIGS. 16a–16d. FIG. 16a–16d show, in FIG. 16a, the track pattern with the trick play segments for the -12× trick play reproduction mode read by the second head. These are the segments 40.5(-12) to 40.8(-12), also shown in FIG. 5a. FIG. 16b shows the signal level of the signal read by the second head during the second half of the revolution of the head drum, in which the trick play segments 40.5(-12) to 40.8(-12) are read, assuming the head follows the ideal scanning trace across the record carrier. From FIG. 16b, it is clear that the maxima lie half-way the trick play segments.

Eq. 8 is, again, modified for generating the error signal for this read head, by again, adding the extra term -b, so that the following equation is used for deriving the error signal:

$$E = \{T_n' - b - (SB_n + C_3)/s + a\} \bmod (2*|n|) - a \qquad \text{(Eq. 9)}$$

The error signal at the location of the maximum $m_9$ now equals:

$$E = \{15 - 12 - (3*s-9+9)/s+12\} \bmod (24) - 12 = 12 \bmod 24 - 12 = 0,$$

see the error signal shown in FIG. 16c.

Suppose now that a mis-tracking over two tracks downwards in FIG. 16a takes place.

Using Eq. 9, this results in the error signals shown in FIG. 16d. The mis-tracking in downwards direction thus leads to a shift in negative direction of the error signals shown in FIG. 16c. The shift in negative direction is higher for larger mis-trackings in the downwards direction. From the discussion with reference to the +12× reproduction mode, it follows that negative error signals lead to a control of the record carrier speed so as to speed up the record carrier speed. This is correct, as such speeding up indeed brings the actual scanning trace back to its ideal scanning trace, as shown in FIG. 16a.

In an equivalent reasoning, a mis-tracking upwards in FIG. 16a, results in a shift in positive direction of the error signals shown in FIG. 16c. The shift in positive direction is higher for larger mis-trackings in the upwards direction in FIG. 16a. From the discussion with reference to the +12× reproduction mode, it also follows that positive error signals lead to a control of the record carrier speed so as to slow down the record carrier speed. This is correct, as such slowing down indeed brings the actual scanning trace back to its ideal scanning trace, as shown in FIG. 16a.

The error signal is, again, only present in the regions around the maxima in the read out signal, and thus absent outside those regions, as explained earlier. Further, in the ideal situation, the error signal portions in the region around a maximum are (again) 'symmetric' around this maximum, as explained earlier. Therefore, integrating such error signal portions leads to a zero value.

Eq. 9 can thus generally be used for deriving the error signal for the forward and the backwards trick play speeds, where b has a relationship with the scanner configuration, as explained above, a preferably equals n for the positive trick play speeds and equals $|n|$ for the negative trick play speeds, $T_n'$ equals $T_n \bmod (2*n)$ for the positive trick play speeds and equals $-T_n \bmod(2*|n|)$ for the negative trick play speeds. Or, more generally, $T_n'$ equals $\text{sgn}(n) \, T_n \bmod (2*|n|)$.

Various embodiments of the tracking control are possible. In one embodiment, only those sync blocks are used for the tracking control that are located in a trick play segment (and in an alternative also those directly around that trick play segment). That means, for the ideal scanning trace in the example of FIG. 13d, that all sync blocks in the trick play segments in the tracks numbered ($T_n$=) 2, 4, 6 and 8 that can be read by the head $H_1$ are used for the tracking control. As a result, the tracking control controls the record carrier speed such that the head follows the ideal scanning trace as closely as possible, so that the maximum signal levels will be obtained when the head is in the middle of the trick play segments shown in FIG. 13d.

Suppose now that, in this example, the track format was such that no trick play segment was present in the track $T_i$, such as, is the case for the maximum that occurs when the head is located on the track numbered 10. In accordance with this embodiment, this would mean that sync blocks in the track $T_i$ will not be used in the tracking control. This is advantageous in the sense that the tracking control indeed controls the scanning line of the head across the record carrier such that its position is optimized with respect to the trick play segments only. This embodiment may result in a low 'sample rate' for the error signal for low trick play speeds.

In a second embodiment, all the sync blocks correctly read will be used in the tracking control. In the above sketched situation where no trick play segment is present in the track $T_i$, this means that the tracking control also controls the scanning line across the record carrier such that the maximum signal level is also optimized at a specific position along the track $T_i$, as if the rack $T_i$ included a trick play segment. Especially in situations where the tracks are not strictly linear, this leads to a control of the scanning line towards a specific position on the track $T_i$, where no trick play segment is located. Moreover, this influences the correct positioning towards the tracks $T_{i-2}$ and $T_{i+2}$ in a negative way. On the other hand, the second embodiment has the advantage that the sync blocks in each track with the correct azimuth can be used to derive the control signal for the tracking control from.

Next, it will be described how the track numbers, or the trick play track numbers, can be derived from the first two bytes in the ID information.

More specifically, the tracking servo control unit 270 in FIG. 10 comprises a unit for retrieving the earlier defined parameters $SEQ_n$, $TP_n$ and $SB_n$ from the first two ID bytes in the three-byte ID area 60 of FIG. 8. A calculation unit is present in the unit 270 that calculates a track number $T_n$ in accordance with the following formula from $SEQ_n$ and $TP_n$:

$$T_n = 6* SEQ_n + 2*TP_n + C_1 \quad \text{(Eq. 10)}$$

Groups of six subsequent tracks can be identified in the track pattern of FIG. 1. The sync blocks in first group of six tracks, counted from the left in FIG. 1, have a sequence number $SEQ_n$ that equals 0 or 8. The sync blocks in the next group of 6 tracks have $SEQ_n=1$ or 9 (decimal). With a 4-bit SEQ number, 16 groups of six tracks can be identified, that is: in total 96 tracks. In each group of 6 tracks, the sync blocks in the first track pair have the track pair number $TP_n$ that equals 0. The sync blocks in the second track pair have the track pair number $TP_n=1$ and sync blocks in the third track pair have $TP_n=2$ (decimal).

With the above formula for $T_n$, it can be explained that the formula converts the SEQ numbers and TP numbers into a track number running from 0 to 95, identifying the 96 tracks in the 16 groups of six tracks.

It should namely be noted that, when the head having the first azimuth scans the record carrier, $C_1=0$ and when the head having the second azimuth scans the record carrier, $C_1=1$. So, when the first head scans the most left track in FIG. 1, $T_n=2*(3*0+0)+0=0$. When the second head scans the second track from the left in FIG. 1, $T_n=2*(3*0+0)+1=1$. When the first head scans the third track from the left, $T_n=2*(3*0+1)+0=2$. When the second head scans the fourth track from the left in FIG. 1, $T_n=2*(3*0+1)+1=3$. When the first head scans the fifth track from the left, $T_n=2*(3*0+2)+0=4$. When the second head scans the sixth track from the left in FIG. 1, $T_n=2*(3*0+2)+1=5$. When the first head scans the seventh track from the left, $T_n=2*(3*1+0)+0=6$, and so on.

The relationship between the track numbers $T_n$ and the trick play track numbers $T_n'$ has been described extensively above.

A most general formula used in calculating the error signal, is the following formula:

$$\{C_4*(T_n'-C_0)-b-C_2*(SB_n+C_3)+a\} \bmod (2*|n|)-a \quad \text{(Eq. 11)}$$

By comparing Eq. 11 with the equation discussed above, one can easily see what values the various parameters in Eq. 11 can have in order to convert the general Eq. 11 into one of the equations discussed and explained above. The parameter $C_3$ requires an additional discussion. In the above explanation, it has been said that $C_3$ equals 9, but that actually the value 9.5 has been chosen for $C_3$.

In the above discussion, it was explained that at the location of a maximum in the read out signal, the error signal was zero. The maximum, however, lies at the boundary between two neighboring (trick play) sync blocks. When looking at FIG. 18a, this figure shows the error signal around the location where a maximum in the read out signal occurs. This maximum occurs at the boundary between the sync blocks numbered 22 and 23, and the error signal is zero at that same location. The error signal can, however, be calculated using the sync block numbers 22 and 23 of the respective sync blocks and one could argue that the error signal thus obtained is the error for a position half way a sync block. The error signal for the sync block 22 is thus a small (positive) value and the error signal for the sync block 22 is thus the same value, but of negative sign. Actually, the zero error signal value cannot be calculated, as the location of the zero error signal value lies half-way between the positions where the calculated error signals for the sync blocks 22 and 23 occur. By this discussion, it has been made plausible that the parameter $C_3$ should have the value 9.5, instead of 9.

It should further be noted that even other values for $C_3$ could have been chosen, as there is also a dependency with the choice for the value of s.

$C_2$ preferably equals 1/s. The values for s can be calculated using the following formula:

$$s = |k*L/(n-1)|$$

where L is the total number of sync blocks in a track, in the present example 356, and where k has a relation to the head drum configuration, and equals 1 in the present example. This results in the following values for s for the various trick play speeds:

| Trick play reproduction mode: n = . . . | value for s |
|---|---|
| +4 | 118.67 |
| +12 | 32.37 |
| +24 | 15.48 |
| −4 | 71.2 |
| −12 | 27.39 |
| −24 | 14.24 |

The values s given in the above table have, of course, some relationship with the distance between the central positions of two subsequent trick play segments read by the same head from two subsequent tracks with the same azimuth. One could use the values for s given in the above table in the calculation using the formula given above. In another elaboration, one could use rounded values for s so as to simplify the calculations. The rounding could be towards integer values or towards 0.5, 0.25 or 0.125.

It has been said previously that only the sync blocks present in the main area will be used for realizing the tracking control. If the further objective exists to correctly read the sub-code information, one could argue that also the sync blocks in the sub-code area 4, see FIGS. 1 and 2, should be used for deriving an error signal for the tracking control. There are arguments to conclude that this is not necessary. One of the reasons is that the length of the sub-code area is relatively small compared to the length that a head scans a track in a trick play mode, during which length the head can read data with sufficient signal level and sufficient accuracy. Further, the distance between the sub-code area 4 and the nearest boundary of the main area 12 is about 38 sync blocks, which is roughly one-ninth of the total length of the main area 12. Therefore, even a tracking control based on the sync blocks in the main area only suffice for an accurate reading of the sub-code area 4. Further, the portion 12b in the main area, comprising parity sync blocks only and no trick play data, is of no interest for tracking purposes in a trick play reproduction mode. It is, therefore, appropriate not to use the sync blocks in the area 12b for deriving the tracking error signal therefrom, as this would mean a deterioration of the tracking control in order to correctly track on the trick play segments in the area 12a of the main area. When using only the sync blocks in the main area 12a for deriving the error signal therefrom, this means that only the sync blocks numbered 29 to 305 will potentially be used for deriving the tracking control signal.

FIGS. 17a–17e show, in FIG. 17e, again the track pattern with the trick play segments for the +12× trick play reproduction mode. Only that portion of the record carrier, with the trick play segments read during one revolution of the head drum by the two heads, are shown. These are the segments 34.1(+12) to 34.8(+12), also shown in FIG. 4a, as well as the sub-code area 34.17(+12) read in this reproduction mode. FIG. 17a shows the signal level of the signal read from the first head during the first half of the revolution of the head drum, in which the trick play segments 38.1(+12) to 38.4(+12), as well as the sub-code portion 34.17(+12), are read, assuming the head follows the ideal scanning trace across the record carrier.

FIG. 17c shows the signal level of the signal read from the second head during the second half of the revolution of the head drum, in which the trick play segments 38.5(+12) to 38.8(+12) are read, assuming the head follows the ideal scanning trace across the record carrier.

FIG. 17b shows the error signal, derived from the sync blocks using one of the equations given above, for the first half revolution of the head drum. FIG. 17d shows the error signal, derived from the sync blocks using one of the equations given above, for the second half revolution of the head drum. The error signals shown in FIGS. 17b and 17d are the same as those shown in FIGS. 13b and 14b, respectively.

In the above discussion, it was said that only the sync blocks in the main area 12a, that is, the sync blocks numbered 29 to 305, were used in the tracking control.

Figure 18A:
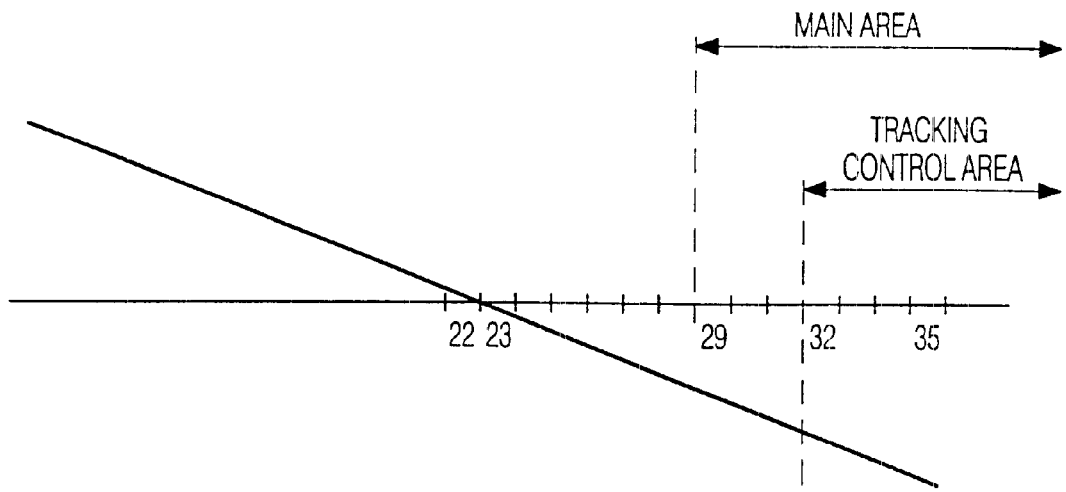
FIGS. 18a and 18b show the behavior of the error signal at the edges of the main area portion of a track.
Figure 18B:
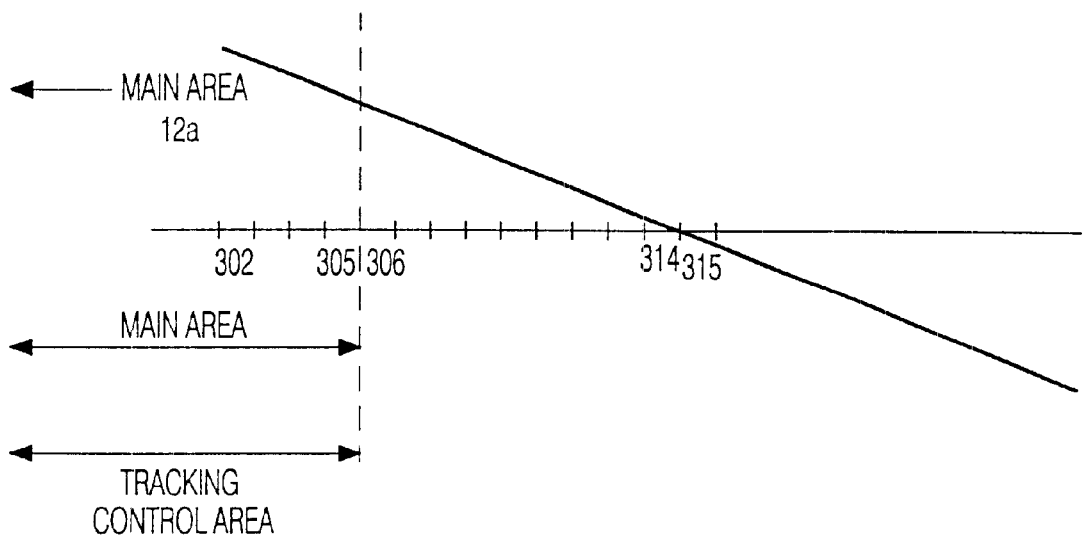

The tracking control comprises an integrating element (not shown) that integrates the error signal at least during one complete revolution of the head drum. Integrating the error signal portions in the regions around the maxima $m_2$ to $m_5$ and $m_8$ to $m_{11}$ result in a zero integrated value, for the reason that those regions fall completely within the main area 12a and the error signal curve around each maximum is 'mirror symmetric4'. The contributions of the regions around the maxima $m_6$ and $m_7$ will now be further discussed. These regions fall only partly in the main area 12a. FIG. 18a shows the situation of the error signal portion that occurs around the maximum $m_7$, and FIG. 18b shows the situation of the error signal portion that occurs around the maximum $m_6$, both on an enlarged scale compared to FIGS. 17a–17e. The error signal portion in FIG. 18a has its zero value between the sync blocks numbered 22 and 23. The main area 12a starts with the sync block numbered 29, as shown in FIG. 18a. The error signal portion in FIG. 18b has its zero value lying at the boundary between the sync blocks 314 and 315. Further, the main area ends with the sync block numbered 305. The negative values of the error signal portion in FIG. 18a, corresponding to the sync blocks numbered 29 and higher, could thus be used for the tracking control, as well as the positive values of the error signal portion in FIG. 18b corresponding to the sync blocks numbered 305 and lower. Suppose that the error signal portions extend over 13 sync blocks around their zero value position. This means that the error signal corresponding to the sync blocks numbered 29 to 35, and the sync blocks 302 to 305 contribute to the tracking control. This leads to an inaccuracy in the tracking control, for the reason that the negative contribution from the sync blocks 29 to 35 is larger than the positive contribution from the sync blocks 302 to 305. In order for both contributions to compensate each other, in order to obtain a zero value for the error signal, integrated over one revolution of the head drum, only the sync blocks numbered 32 and higher should be used. This limits the sync blocks used for deriving the error signal therefrom to the sync blocks numbered 32 to 305 in the main area 12a. The portion of the tracks formed by the sync blocks numbered 32 to 305 is therefore called the tracking control area in FIG. 18.

Figure 19:
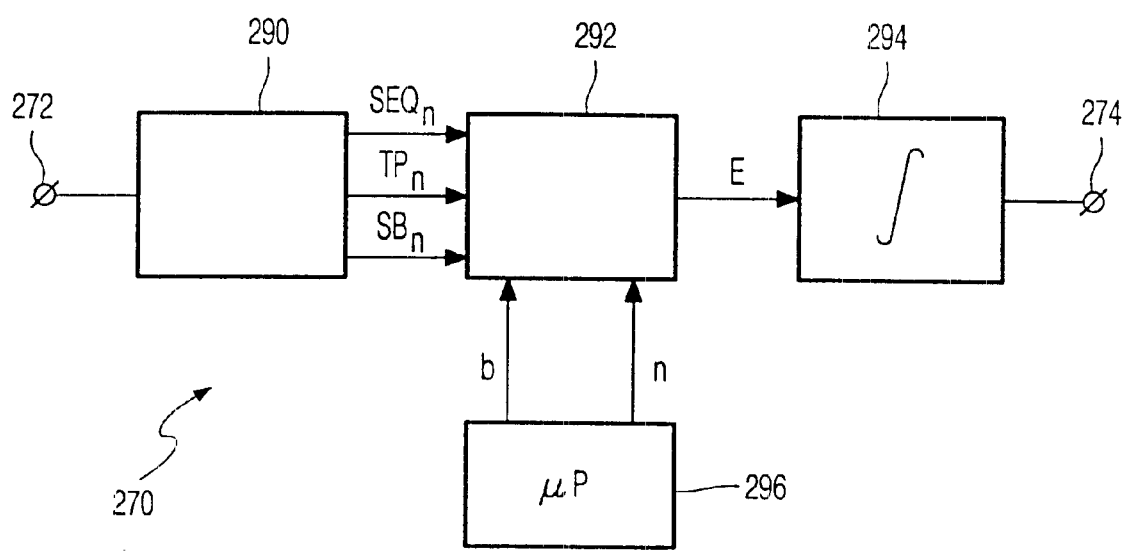
FIG. 19 shows an embodiment of the unit for deriving the tracking control signal from the track identification information and the sync block identification information.

FIG. 19 shows, schematically, an embodiment of the tracking control unit 270 in FIG. 10. The tracking control unit 270 comprises a retrieval unit 290 for retrieving the variables $SEQ_n$, $TP_n$ and $SB_n$ from the ID information in the sync blocks supplied to the input 272 of the unit 270, and supplies the variables obtained to a calculation unit 292 which calculates an error signal E, as explained above, from the variables $SEQ_n$ and $TP_n$, as well as the other values and constants in the equations given above. More specifically, an input value for b, identifying which head is in scanning relationship with the record carrier, is inputted from a microprocessor 296, as well as information identifying the trick play speed and direction. The error signal E obtained is supplied to an integrating element 294. An output of the integrating element is coupled to the output 274 of the unit 270.

While the invention has been described with reference to preferred embodiments thereof, it is to be understood that these are not limitative examples. Thus, various modifications may become apparent to those skilled in the art, without departing from the scope of the invention, as defined by the claims. The first information signal thus may be another type of signal than a digital video signal and/or an audio signal, such as a data signal. Further, the trick play signal recorded in the trick play segments could be an information signal which has no relationship whatsoever with the first digital information signal. In such an embodiment, the record carrier is a recording medium on which a multiplicity of transmission channels are available for transmitting independent information signals. Further, the invention has been described with reference to a track pattern as shown in the FIGS. 1, 1a, 3, 3a, . . . , 7 and 7a. It should however be noted the derivation of the error signal is not restricted to this track pattern. The same calculation is equally well useable for other track patterns.

LIST OF RELATED DOCUMENTS (D1) U.S. Pat. No. 5,579,183 (PHN 14818)
(D2) International Patent Application No. WO 95/28061, corresponding to U.S. Pat. Nos. 5,751,889 and 6,118,922 (PHN 14832)
(D3) Unpublished European Patent Application No. 97203515.8, corresponding to International Patent Application No. WO 98/34226 and U.S. Pat. No. 6,222,981 (PHN 16614)
(D4) U.S. Pat. No. 5,142,421 (PHN 13537)

What is claimed is:

1. Apparatus for reproducing a first digital information signal, recorded in slant tracks on a longitudinal record carrier, in a trick play reproduction mode, the record carrier being transported, in said trick play reproduction mode, with a speed which equals n times a nominal reproduction speed, n being a constant whose magnitude is larger than 1, said slant tracks comprising a main signal recording portion in which sync blocks of information are recorded, the main signal recording portion comprising sync blocks containing a portion of information of said first digital information signal, and sync blocks containing a portion of a second digital information signal, said second digital information signal being a signal for reproduction in another reproduction mode, said sync blocks of information further comprising:
   track identification information, identifying the tracks in subsequent groups of a fixed number of subsequent tracks; and
   sync block identification information, identifying the sync block in the sequence of sync blocks in said main signal recording portion of a track,
said sync blocks comprising a portion of information of the first digital information signal being recorded in trick play segments located at various locations in said main signal recording portions in said tracks,
the apparatus comprising:
   read means for reading information from said record carrier, said read means comprising at least a first and a second read head having mutually different azimuth angles located on a rotatable head drum;
   transport means for transporting the record carrier with a specified speed;
   tracking control means for carrying out a tracking control during reproduction in said trick play reproduction mode in response to a tracking control signal thereby enabling said read means to read information from said trick play segments, the tracking control means comprising:
      means for generating a tracking error signal from said track identification information and said sync block identification information; and
      means for deriving said tracking control signal from said tracking error signal, whereby the tracking control means controls the speed of the record carrier such that the path that said first or second read head follows across the record carrier during one revolution of the rotatable head drum is controlled towards a reference path for said trick play reproduction mode across said record carrier, said reference path enabling optimal reproduction of information from said trick play segments for said trick play reproduction mode.

2. The apparatus as claimed in claim 1, wherein the tracking control means controls the speed of the record carrier such that the error signal is controlled to a value substantially equal to zero for a location in the middle of said trick play segments for said trick play-reproduction mode.

3. The apparatus as claimed in claim 1, wherein said generating means generates said tracking error signal from said track identification information and said sync identification information using a calculation equivalent to the following formula:

$$(T_n'-C_0)-b-C_2*(SB_n+C_3),$$

where $T_n'$ is a value equal to a track identification number derived from said track identification information in a sync block read by said first or second read head, $SB_n$ is a value equal to a sync block identification number derived from said sync block identification information of the said sync block, $C_0$ and $C_3$ are constants, and b is a parameter having a relationship with the configuration of the head drum, and a relationship with the specific head of said first and second read heads that is in operational contact with the record carrier.

4. The apparatus as claimed in claim 3, wherein said generating means generates said tracking error signal using a calculation equivalent to the following formula:

$$\{(T_n'-C_0)-b-C_2*(SB_n+C_3)\} \bmod (m*|n|),$$

where m is a constant, which is preferably equal to 2.

5. The apparatus as claimed in claim 4, wherein said generating means generates said tracking error signal using a calculation equivalent to the following formula:

$$\{(T_n'-C_0)-b-C_2*(SB_n+C_3)+a\} \bmod (m*|n|)-a,$$

where a is a constant.

6. The apparatus as claimed in claim 3, wherein $C_0=0$.

7. The apparatus as claimed claim 3, wherein $C_2=1/s$, where s is a constant equal to the difference between a first and a second distance, viewed in the direction of a slant track and expressed in numbers of sync blocks, the first distance being the distance in a first slant track from a reference position in said first slant track to a position where said first or second read head, when following the reference path, is positioned on said slant track, and the second distance being the distance in the next slant track, from the reference position in said next slant track to a position where the same first or second read head, when following the reference path, is positioned onto said next slant track.

8. The apparatus as claimed in claim 3, wherein $C_2=1$.

9. The apparatus as claimed in claim 5, wherein a equals $|n|$.

10. The apparatus as claimed in claim 3, wherein $T_n'=\text{sgn}(n) \, T_n \bmod(2*|n|)$, where
   $T_n \bmod(2*|n|)$ is a trick play sync block number cyclically running from 0 to $2|n|-1$, and $T_n$ is a track number derived from said track identification information and running from 0 to a value larger than $2|n|-1$, preferably, from 0 to $p*(2|n|-1)$, and p is a positive integer.

11. The apparatus as claimed in claim 3, wherein the first read head and the second read head are spaced 180° apart around the circumference of the head drum, that b=0 when the first read head is in operational contact with the record carrier and b equals $|n|$ when the second read head is in operational contact with the record carrier.

12. The apparatus as claimed in claim 3, wherein the first and second read heads are arranged in a head pair located next to each other at the circumference of the head drum, that b=0 for the tracking error signal generated from the information read by the first head, and b=1 for the tracking error signal generated from the information read by the second head.

13. The apparatus as claimed in claim 3, wherein the read means further comprises third and fourth read heads, said first, second, third and fourth read heads spaced at 90° intervals around the circumference of the head drum, that b=0 for the first read head in operational contact with the record carrier, that b=|n| for the second read head in operational contact with the record carrier, that b=2*|n| for the third read head in operational contact with the record carrier, and that b=4*|n| for the fourth read head in operational contact with the record carrier.

14. The apparatus as claimed in claim 3, wherein the first and second read heads are arranged in a first head pair located next to each other at the circumference of the head drum, and the read means further comprises a second head pair of a third and a fourth read head located next to each other at the circumference of the head drum, the first and second head pairs being spaced 180° apart around the circumference of the head drum, that b=0 for the first read head in operational contact with the record carrier, that b=1 for the second read head in operational contact with the record carrier, that b=2*|n| for the third read head in operational contact with the record carrier, and that b=2*|n|+1 for the fourth read head in operational contact with the record carrier.

15. The apparatus as claimed in claim 3, wherein the first and second read heads are arranged in a first head pair located next to each other at the circumference of the head drum, and the read means further comprises a second head pair including a third and a fourth read head located next to each other at the circumference of the head drum, the first and second head pairs being spaced 180° apart around the circumference of the head drum, that b=0 for the first read head and the third read head in operational contact with the record carrier, and that b=1 for the second read head and the fourth read head in operational contact with the record carrier.

16. The apparatus as claimed in claim 7, wherein n=+4 and s is substantially equal to 119.

17. The apparatus as claimed in claim 7, wherein n=+12 and s is substantially equal to 32.

18. The apparatus as claimed in claim 7, wherein n=24 and s is equal to substantially 15.

19. The apparatus as claimed in claim 7, wherein n=−4 and s is substantially equal to 71.

20. The apparatus as claimed in claim 7, wherein n=−12 and s is substantially equal to 27.

21. The apparatus as claimed in claim 7, wherein n=−24 and s is substantially equal to 14.

* * * * *